United States Patent
Lee et al.

(10) Patent No.: US 11,172,206 B2
(45) Date of Patent: *Nov. 9, 2021

(54) INTRA PREDICTION MODE ENCODING/DECODING METHOD AND APPARATUS

(71) Applicants: ELECTRONICS AND TELECOMMUNICATIONS RESEARCH INSTITUTE, Daejeon (KR); INDUSTRY-UNIVERSITY COOPERATION FOUNDATION KOREA AEROSPACE UNIVERSITY, Goyang-si (KR)

(72) Inventors: Jin Ho Lee, Daejeon (KR); Hui Yong Kim, Daejeon (KR); Sung Chang Lim, Daejeon (KR); Jin Soo Choi, Daejeon (KR); Jin woong Kim, Daejeon (KR); Jae Gon Kim, Goyang-si (KR); Hae Chul Choi, Daejeon (KR); Sang Yong Lee, Goyang-si (KR)

(73) Assignees: Electronics and Telecommunications Research Institute, Daejeon (KR); Intellectual Discovery Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/850,342

(22) Filed: Apr. 16, 2020

(65) Prior Publication Data

US 2020/0252620 A1    Aug. 6, 2020

Related U.S. Application Data

(63) Continuation of application No. 15/913,099, filed on Mar. 6, 2018, now Pat. No. 10,666,950, which is a
(Continued)

(30) Foreign Application Priority Data

Jan. 30, 2012 (KR) .................. 10-2012-0009222
Jan. 30, 2013 (KR) .................. 10-2013-0010488

(51) Int. Cl.
H04N 19/157    (2014.01)
H04N 19/70     (2014.01)
(Continued)

(52) U.S. Cl.
CPC .......... *H04N 19/157* (2014.11); *H04N 19/11* (2014.11); *H04N 19/176* (2014.11);
(Continued)

(58) Field of Classification Search
CPC .... H04N 19/11; H04N 19/157; H04N 19/176; H04N 19/198; H04N 19/593; H04N 19/70
See application file for complete search history.

(56) References Cited

U.S. PATENT DOCUMENTS 9,154,796 B2    10/2015 Seregin et al.
2012/0082223 A1*  4/2012 Karczewicz ........... H04N 19/91
                                                              375/240.12
(Continued)

FOREIGN PATENT DOCUMENTS

KR    10-2010-0112247 A    10/2010
KR    10-2011-0003414 A    1/2011
(Continued)

OTHER PUBLICATIONS

Chuang et al., Luma Intra Prediction Mode Coding, Jul. 2011, Joint Collaborative Team on Video Coding (JCT-VC) of ITU-T SG16 WP3 and ISO/IEC JTC1/SC29/WG11 (Year: 2011).*
(Continued)

*Primary Examiner* — Francis Geroleo
(74) *Attorney, Agent, or Firm* — NSIP Law

(57) ABSTRACT

An intra prediction mode encoding and decoding method, an image decoding device, and an image encoding device operate by deriving most probable modes (MPMs) from surrounding prediction units adjacent to a current prediction
(Continued)

unit and deriving an intra prediction mode of the current prediction unit on the basis of an MPM flag indicating whether an MPM having the same prediction mode as the intra prediction mode of the current prediction unit exists among the derived MPMs.

2 Claims, 17 Drawing Sheets

Related U.S. Application Data continuation of application No. 14/365,663, filed as application No. PCT/KR2013/000770 on Jan. 30, 2013, now Pat. No. 9,955,169.

(51) Int. Cl.
*H04N 19/196* (2014.01)
*H04N 19/176* (2014.01)
*H04N 19/593* (2014.01)
*H04N 19/11* (2014.01)

(52) U.S. Cl.
CPC ......... *H04N 19/198* (2014.11); *H04N 19/593* (2014.11); *H04N 19/70* (2014.11)

(56) References Cited

U.S. PATENT DOCUMENTS

| | | | |
|---|---|---|---|
| 2012/0177113 A1* | 7/2012 | Guo .................... | H04N 19/463 375/240.12 |
| 2012/0327999 A1 | 12/2012 | Francois et al. | |
| 2013/0114707 A1 | 5/2013 | Seregin et al. | |
| 2013/0170546 A1 | 7/2013 | Kim et al. | |
| 2013/0188695 A1* | 7/2013 | Maani .................... | H04N 19/61 375/240.12 |
| 2014/0086323 A1* | 3/2014 | Chuang ................ | H04N 19/593 375/240.12 |
| 2014/0119439 A1 | 5/2014 | Guo et al. | |
| 2014/0126629 A1* | 5/2014 | Park ..................... | H04N 19/176 375/240.02 |
| 2015/0131722 A1 | 5/2015 | Guo et al. | |

FOREIGN PATENT DOCUMENTS

| | | |
|---|---|---|
| KR | 10-2011-0073263 A | 6/2011 |
| KR | 10-2011-0118641 A | 10/2011 |
| WO | WO 2010/087157 A1 | 8/2010 |

OTHER PUBLICATIONS

Drugeon, V., Wedi, T., & Palfner, T. "High Precision Edge Prediction for Intra Coding" In Image Processing, 2008. 15th IEEE International Conference on IEEE (pp. 1620-1623) (Oct. 2008).

International Search Report dated Jun. 14, 2013 in corresponding International Patent Application No. PCT/KR2013/000770 (5 pages, in Korean with English Translation).

Weigand et. al., WD3:Working Draft 3 of High-Efficiency Video Coding, Mar. 16-23, 2011, Joint Collaborative Team on Video Coding of ITU-T SG16 and ISO/IEC JTC1/SC29/WG11, 5$^{th}$ Meeting: Geneva.

Chuang, Tzu-Der et al. "Luma Intra Prediction Mode Coding", Joint Collaborative Team on Video Coding (JCT-VC) of ITU-T SG16 WP3 and ISO/IEC JTC1/SC29/WG11, 6$^{th}$ Meeting: Torino Italy, Jul. 14-22, 2011 (5 pages in English).

* cited by examiner (a)

| prediction_unit(x0, y0, log2CUSize) { | Descriptor |
|---|---|
| ... | |
| 610 → prev_intra_luma_pred_flag[x0][y0] | u(1) \| ae(v) |
| if( prev_intra_luma_pred_flag[x0][y0] ) | |
| 620 →   mpm_idx[x0][y0] | u(1) \| ae(v) |
| else | |
| 630 →   rem_intra_luma_pred_mode[x0][y0] | ce(v) \| ae(v) |
| ... | |
| } | |

INTRA PREDICTION MODE ENCODING/DECODING METHOD AND APPARATUS

CROSS-REFERENCE TO RELATED APPLICATIONS

This application is a continuation of application Ser. No. 15/913,099 filed on Mar. 6, 2018, which is a continuation of application Ser. No. 14/365,663 having a 371(c) date of Jun. 16, 2014, now U.S. Pat. No. 9,955,169 issued on Apr. 24, 2018, which is a U.S. national stage application of International Application No. PCT/KR2013/000770 filed on Jan. 30, 2013, which claims the benefit of Korean Patent Application No. 10-2012-0009222 filed on Jan. 30, 2012, and Korean Patent Application No. 10-2013-0010488 filed on Jan. 30, 2013, in the Korean Intellectual Property Office, the entire disclosures of which are incorporated by reference for all purposes.

BACKGROUND OF THE INVENTION

Field of the Invention

The present invention concerns image encoding/decoding, and more specifically, to an intra prediction mode encoding/decoding method and apparatus.

Related Art

Demand for high-quality, high-resolution images such as HD (High Definition) images and UHD (Ultra High Definition) images increases in various applicable fields. As image data advances to high resolution and high quality, the data amount is relatively increased compared to existing image data. Thus, when image data is transmitted through media such as conventional wired/wireless broadband circuit networks or is stored in existing storage media, costs for transmission and storage go up. To address such problems that may occur as image data happens to have high resolution and high quality, high-efficiency image compression technologies may be utilized.

Various image compression technologies exist, such as intra prediction that predicts the value of a pixel included in a current picture from a previous or subsequent picture of the current picture, inter prediction that predicts the value of a pixel included in a current picture using information on the pixel in the current picture, and entropy encoding that assigns a shorter code to a high-frequent value while assigning a longer code to a low-frequent value. Such image compression technologies allow image data to be effectively compressed and to be then transmitted or stored.

SUMMARY OF THE INVENTION

The present invention provides an image encoding/decoding method and apparatus that may enhance image encoding/decoding efficiency.

The present invention provides an intra prediction mode encoding/decoding method and apparatus that may enhance image encoding/decoding efficiency.

According to an aspect of the present invention, an intra prediction mode decoding method is provided. The method comprises deriving MPMs (Most Probable Modes) from a neighboring prediction unit adjacent to a current prediction unit and deriving an intra prediction mode of the current prediction unit based on an MPM flag indicating whether there is, among the derived MPMs, an MPM having the same prediction mode as the intra prediction mode of the current prediction unit.

In a case where the MPM flag indicates that there is, among the derived MPMs, an MPM having the same prediction mode as the intra prediction mode of the current prediction unit, an MPM indicated by an MPM index among the derived MPMs may be derived as the intra prediction mode of the current prediction unit, and the MPM index indicates which MPM of the derived MPMs may be the same as the intra prediction mode of the current prediction unit.

In a case where the MPM flag indicates that there is, among the derived MPMs, no MPM having the same prediction mode as the intra prediction mode of the current prediction unit, the step of deriving the intra prediction mode of the current prediction unit may comprise the steps of sorting the derived MPMs according to mode values, setting a remaining intra prediction mode determined based on remaining intra prediction modes except the derived MPM among all intra prediction modes as the intra prediction mode of the current prediction unit, and deriving a final intra prediction mode of the current prediction unit by comparing a candidate intra prediction mode of the current prediction unit with the sorted MPMs.

In the step of deriving the final intra prediction mode of the current prediction unit, if the candidate intra prediction mode of the current prediction unit is equal to or larger than the sorted MPMs, a mode value of the candidate intra prediction mode of the current prediction unit may be increased by 1 while the candidate intra prediction mode is sequentially compared with the sorted MPMs, and if the comparison with the sorted MPMs is terminated, the candidate intra prediction mode of the current prediction unit may be derived as a final intra prediction mode of the current prediction unit.

In the step of sorting the derived MPMs according to mode values, the derived MPMs may be sorted in an ascending order of the mode values.

The derived MPMs may be sorted while being assigned with an MPM index in a predetermined order, and the neighboring prediction unit may be a left prediction unit adjacent to a left side of the current prediction unit and an upper prediction unit adjacent to an upper side of the current prediction unit.

According to another aspect of the present invention, an image decoding apparatus is provided.

The apparatus comprises an entropy decoding unit that entropy-decodes intra prediction mode information including an MPM flag from a bit stream and a predicting unit that derives MPMs (Most Probable Modes) from a neighboring prediction unit adjacent to a current prediction unit, derives an intra prediction mode of the current prediction unit based on the MPM flag, and performs intra prediction on the current prediction unit based on the derived intra prediction mode, wherein the MPM flag indicates whether there is, among the derived MPMs, an MPM having the same prediction mode as the intra prediction mode of the current prediction unit.

According to still another aspect of the present invention, an intra prediction mode encoding method is provided. The method comprises the steps of deriving MPMs (Most Probable Modes) from a neighboring prediction unit adjacent to a current prediction unit and deriving an intra prediction mode of the current prediction unit based on whether there is, among the derived MPMs, an MPM having the same prediction mode as the intra prediction mode of the current prediction unit.

If there is, among the derived MPMs, an MPM having the same prediction mode as the intra prediction mode of the current prediction unit, in the step of deriving the intra prediction mode of the current prediction unit, a value of an MPM index may be derived which is assigned to the MPM having the same prediction mode as the intra prediction mode of the current prediction unit among the derived MPMs.

If there is, among the derived MPMs, no MPM having the same prediction mode as the intra prediction mode of the current prediction unit, the step of deriving the intra prediction mode of the current prediction unit may comprise the steps of sorting the derived MPMs according to mode values, setting the intra prediction mode of the current prediction unit as a candidate remaining intra prediction mode, and deriving a remaining intra prediction mode for the current prediction unit by comparing the candidate remaining intra prediction mode with the sorted MPMs.

In the step of deriving the remaining intra prediction mode for the current prediction unit, if the candidate remaining intra prediction mode is larger than the sorted MPMs, a mode value of the candidate remaining intra prediction mode may be decreased by 1 while the candidate remaining intra prediction mode is sequentially compared with the sorted MPMs, and if the comparison with the sorted MPMs is terminated, the candidate remaining intra prediction mode may be derived as the remaining intra prediction mode for the current prediction unit.

In the step of sorting the derived MPMs according to mode values, the derived MPMs may be sorted in an ascending order of the mode values.

The derived MPMs may be sorted while being assigned with an MPM index in a predetermined order, and the neighboring prediction unit may be a left prediction unit adjacent to a left side of the current prediction unit and an upper prediction unit adjacent to an upper side of the current prediction unit.

According to yet still another aspect of the present invention, an image encoding apparatus is provided. The apparatus comprises a predicting unit that derives MPMs (Most Probable Modes) from a neighboring prediction unit adjacent to a current prediction unit, derives an MPM flag based on whether there is, among the derived MPMs, an MPM having the same prediction mode as the intra prediction mode of the current prediction unit, derives an intra prediction mode of the current prediction unit based on the MPM flag, and performs intra prediction on the current prediction unit based on the intra prediction mode and an entropy encoding unit that entropy-encodes information on the intra prediction mode including the MPM flag.

Upon encoding and/or decoding an intra prediction mode, a sorting operation such as min/max is not always performed on MPMs derived from a neighboring prediction unit adjacent to a current prediction unit but is carried out depending on whether there is, among the derived MPMs, an MPM having the same prediction mode as the intra prediction mode of the current prediction unit. Accordingly, operation complexity of the image encoder/decoder may be reduced. Or, the intra prediction mode may be encoded/decoded without performing a sorting operation to the MPMs by fulfilling an additional condition check when comparing remaining intra prediction modes with a first MPM of the derived MPMs. The present invention may be applicable to all applications that use existing video codecs.

BRIEF DESCRIPTION OF THE DRAWINGS

FIG. 6 shows an example of syntax schematically illustrating an encoding and/or decoding method of an intra prediction mode as shown in FIG. 5.

DESCRIPTION OF EXEMPLARY EMBODIMENTS

Figure 1:
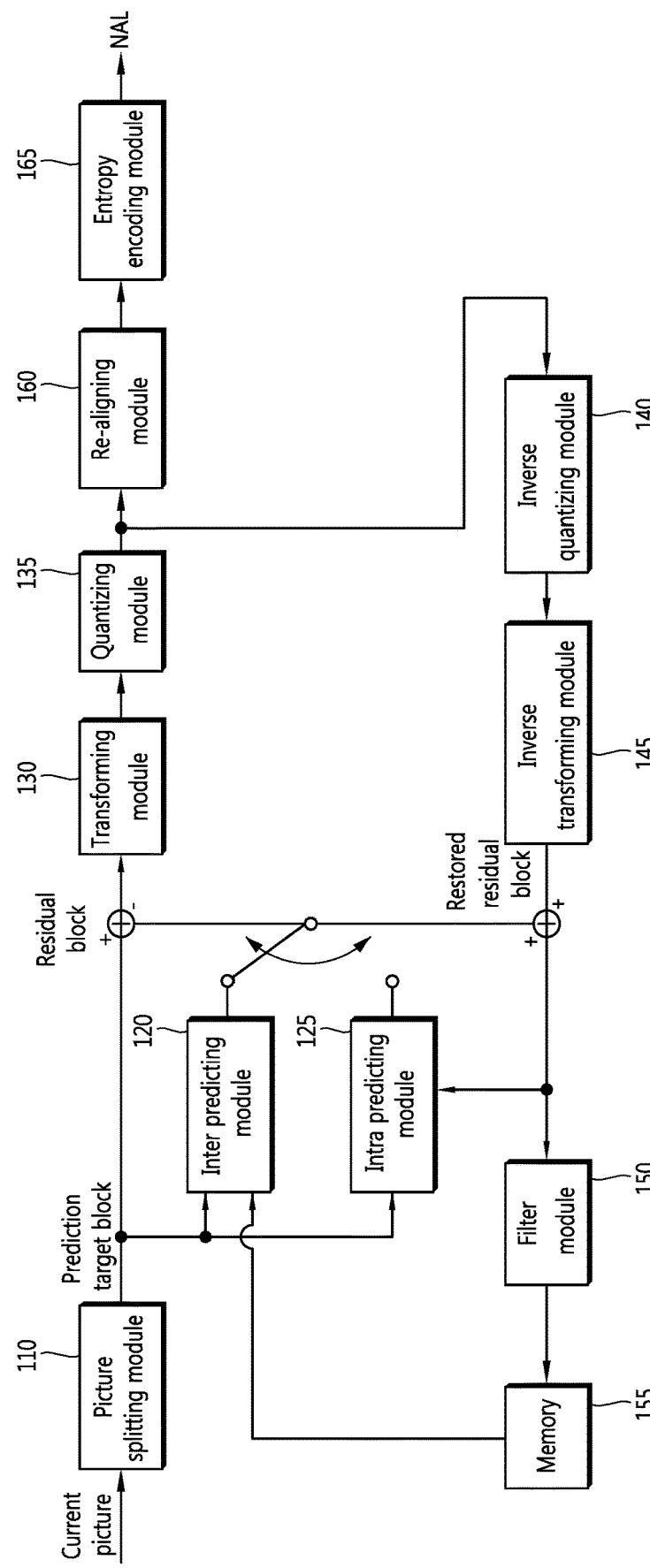
FIG. 1 is a block diagram illustrating an image encoding apparatus according to an embodiment of the present invention.

Various modifications may be made to the present invention and the present invention may have a number of embodiments. Specific embodiments are described in detail with reference to the drawings. However, the present invention is not limited to specific embodiments, and it should be understood that the present invention includes all modifications, equivalents, or replacements that are included in the spirit and technical scope of the present invention.

The terms "first" and "second" may be used to describe various components, but the components are not limited thereto. These terms are used only to distinguish one component from another. For example, the first component may be also named the second component, and the second component may be similarly named the first component. The term "and/or" includes a combination of a plurality of related items as described herein or any one of the plurality of related items.

When a component is "connected" or "coupled" to another component, the component may be directly connected or coupled to the other component. In contrast, when a component is directly connected or coupled to another component, no component intervenes.

The terms used herein are given to describe the embodiments but not intended to limit the present invention. A singular term includes a plural term unless otherwise stated. As used herein, the terms "include" or "have" are used to indicate that there are features, numerals, steps, operations, components, parts or combinations thereof as described herein, but do not exclude the presence or possibility of addition of one or more features, numerals, steps, operations, components, parts or components thereof.

Hereinafter, preferred embodiments of the present invention will be described in greater detail with reference to the accompanying drawings. The same reference numerals refer to the same components throughout the drawings, and the description of the same components is not repeated.

FIG. 1 is a block diagram illustrating an image encoding apparatus according to an embodiment of the present invention.

Referring to FIG. 1, the image encoding apparatus 100 may include a picture splitting module 110, predicting modules 120 and 125, a transforming module 130, a quantizing module 135, a re-aligning module 160, an entropy encoding module 165, an inverse quantizing module 140, an inverse transforming module 145, a filter module 150, and a memory 155.

As illustrated in FIG. 1, the components are provided independently from each other to show respective different features, but such configuration does not necessarily mean that the components are configured as respective separate hardware or software constitutional units. In other words, such configuration is merely provided for purposes of description, and at least two of the components may be combined into a single component, or one of the components may be split into a plurality of components, and the combined component or split components may also perform their respective functions, according to embodiments, which are also included in the scope of the invention without departing from the gist of the invention.

Further, some of the components may be optional rather than being inevitable for performing the substantial functions as suggested herein. The present invention may include only the components necessary to implement the subject matter of the present invention, and the structure which excludes optional components used to merely enhance performance also belongs to the scope of the present invention.

The picture splitting module 110 may split an input picture into at least one processing unit. At this time, the processing unit may be a prediction unit (PU) or prediction block (PB), a transform unit (TU) or transform block (TB), or a coding unit (CU) or coding block (CB). Further, the picture splitting module 110 may split a picture into slices/tiles/substreams.

The picture splitting module 110 may split one picture into a plurality of combinations of coding units, prediction units, and transform units and may select a combination of a coding unit, a prediction unit, and a transform unit based on a predetermined reference (e.g., expense function) and may thereby encode the picture.

For example, one picture may be split into a plurality of coding units. To split a picture into coding units, a recursive tree structure such as Quad Tree Structure may be used. A coding unit, which is split into other coding units using, as a route, one image or maximum size coding unit (Coding Tree Unit; CTU), may be subject to splitting with as many child nodes as the number of the split coding units. As a coding unit does not undergo splitting any longer due to a predetermined restriction, the coding unit becomes a leaf node. In other words, assuming that only square splitting may be applicable to one coding unit, one coding unit may be split into a maximum of four different coding units, and the split coding units may be put into a further splitting process. At this time, the number of times of splitting may be limited by the minimum size of coding unit or the maximum depth possessed by coding unit.

In an embodiment, the "coding unit" may be hereinafter intended to mean a basis for decoding as well as encoding.

A prediction unit may be split as having at least one shape such as a square or rectangle having the same size in one coding unit or in such a manner that one of prediction units in one coding unit has a different shape from that of another.

Upon generating a prediction unit for performing intra prediction based on a coding unit (2N×2N), the coding unit, which is not a minimum coding unit, would be subjected to intra prediction without being split into a plurality of prediction units (N×N). Here, N may correspond to half of the horizontal or vertical length of the coding unit (or block).

The predicting modules 120 and 125 may include an inter predicting module 120 that performs inter prediction and an intra predicting module 125 that performs intra prediction. At this time, a processing unit in which prediction is performed may differ from a processing unit in which a prediction mode is determined. For example, a prediction mode may be determined on a per-prediction unit basis, and prediction may be carried out on a per-transform unit basis. A residual value (residual block) between a generated prediction block and an original block may be input to the transforming module 130. Further, prediction mode information used for prediction or motion vector information, together with the residual value, may be encoded in the entropy encoding module 165 and may be then transferred to a decoder. In case a specific encoding mode is used, the original block may be encoded, as is, without generating a prediction block through the predicting modules 120 and 125, and may be then transferred to the decoding unit.

The inter prediction module 120 may predict a prediction unit based on information on at least one of a previous picture and a subsequent picture of a current picture. The inter prediction module 120 may include a reference picture interpolating unit, a motion predicting unit, and a motion compensating unit.

The reference picture interpolating unit may receive reference picture information from the memory 155 and may generate information on pixels whose number is less than an integer from the reference picture. In the case of brightness pixels, a DCT-based 8-tab interpolation filter may be used which changes its filter coefficient so as to generate information on a pixel whose number is less than an integer on a per ¼ pixel basis. In the case of color difference pixels, a DCT-based 4-tab interpolation filter may be used which changes its filter coefficient so as to generate information on a pixel whose number is less than an integer on a per ⅛ pixel basis.

The motion predicting unit may perform motion prediction based on a reference picture interpolated by the reference picture interpolating unit. Various schemes may be used to yield a motion vector, such as FBMA(Full search-based Block Matching Algorithm), TSS(Three Step Search), or NTS(New Three-Step Search Algorithm). The motion vector may have a ½ or ¼ pixel unit motion vector value based on an interpolated pixel. The motion predicting unit may predict a current prediction unit, with different motion prediction schemes applied. As the motion prediction schemes, various methods, such as a skip method, a merge method, or an AMVP (Advanced Motion Vector Prediction) methods, may be adopted.

The intra predicting module 125 may generate a prediction unit based on information on a reference pixel adjacent to a current block which is information on a pixel in a current picture. At this time, in case the reference pixel is unavailable, the information of the unavailable reference pixel may be replaced with at least one available reference pixel and may be thus used.

As prediction modes for intra prediction, there may be a directional prediction mode that uses reference pixel information depending on a prediction direction and a non-directional mode that does not use information on directivity when performing prediction. A mode for predicting brightness information may be different from a mode for predicting color difference information. Predicted brightness signal information or intra prediction mode information obtained by predicting brightness information may be utilized to predict color difference information.

In case the prediction unit is the same in size as the transform unit when performing intra prediction, intra prediction may be conducted on the prediction unit based on pixels positioned at a left side and a left and lower side of the prediction unit, a pixel positioned at a left and upper side thereof, and pixels positioned at an upper side and an upper and right side thereof. However, in case the size of the prediction unit differs from the size of the transform unit when intra prediction is performed, intra prediction may be carried out using a reference pixel based on the transform unit. Further, the coding unit may be generally identical in size to the prediction unit, and intra prediction using N×N prediction unit splitting may be applied only to a minimum coding unit.

An intra prediction method may apply an AIS (Adaptive Intra Smoothing) filter to a reference pixel depending on a prediction mode or the block size and may then generate a prediction block. The type of an AIS filter applicable to the reference pixel may vary. In order to perform an intra prediction method, an intra prediction mode of a current prediction unit may be predicted from an intra prediction mode of a prediction unit present adjacent to the current prediction unit. In case the prediction mode of the current prediction unit is predicted using mode information predicted from an adjacent prediction unit, if the current prediction unit is the same as the adjacent prediction unit in terms of the intra prediction mode, predetermined flag information may be used to transmit information representing that the current prediction unit is the same in the prediction mode as the adjacent prediction unit, and if the current prediction unit is different in prediction mode from the adjacent prediction unit, entropy encoding may be performed to encode the prediction mode information of the current prediction unit (block).

Further, the predicting modules 120 and 125 may generate a residual block including information on a residual value that is a difference between a prediction block and an original block. The prediction block may be generated on a per-prediction unit or per-transform unit basis. The generated residual block may be input to the transforming module 130.

The transforming module 130 may transform the residual block including the residual information of the prediction unit generated through the predicting modules 120 and 125 and the original block using a transforming scheme, such as DCT (Discrete Cosine Transform) or DST (Discrete Sine Transform). Whether DCT or DST is applied to transforming the residual block may be determined based on the intra prediction mode of the prediction unit used to generate the residual block, size of the transform block, or color component (regarding whether it is a brightness signal or color difference signal) information.

The quantizing module 135 may quantize values transformed in the frequency domain. According to blocks or degree of importance of images, the quantized coefficient may change. A value produced from the quantizing module 135 may be provided to the inverse quantizing module 140 and the re-aligning module 160.

The re-aligning module 160 may re-align coefficients with respect to the quantized residual values.

The re-aligning module 160 may change a 2D (Two-Dimensional) block-type coefficient to a one-dimensional vector through a coefficient scanning method. For example, the re-aligning module 160 may make changes in the form of one-dimensional vectors by scanning a DC coefficient to high-frequency area coefficients through a zig-zag scanning method. Rather than the zig-zag scanning, a vertical scanning in which a 2D block-type coefficient is scanned in a column direction and a horizontal scanning in which a 2D block-type coefficient is scanned in a row direction may be also used depending on the size of the transform unit and an intra prediction mode, or a color component. In other words, according to the size of the transform unit and intra prediction mode or color component, it may be determined which one is to be used of the zig-zag scanning, vertical direction scanning, and horizontal direction scanning.

The entropy encoding module 165 may perform entropy encoding based on values produced by the re-aligning module 160. The entropy encoding may adopt various encoding schemes, such as Exponential Golomb, CAVLC (Context-Adaptive Variable Length Coding), or CABAC (Context-Adaptive Binary Arithmetic Coding).

The entropy encoding module 165 may encode various types of information, such as per-coding unit residual value coefficient information and block type information, prediction mode information, splitting unit information, prediction unit information and transmission unit information, motion vector information, reference frame information, block interpolation information, and filtering information, from the re-aligning module 160 and the predicting modules 120 and 125.

The entropy encoding module 165 may entropy encode per-coding unit coefficients input from the re-aligning module 160.

The inverse quantizing module 140 inverse-quantizes values quantized in the quantizing module 135, and the inverse transforming module 145 inverse-transforms the inverse-quantized values. A residual value generated in the inverse quantizing module 140 and the inverse transforming module 145 is added to a prediction unit predicted through a motion estimating unit, a motion compensating unit, and an intra predicting unit included in the predicting modules 120 and 125, thereby generating a restored block.

The filter module 150 may include at least one of a deblocking filter, a SAO (Sample Adaptive Offset), and an ALF (Adaptive Loop Filter).

The deblocking filter may remove a blocking artifact that occurs due to a boundary between blocks in a restored picture. To determine whether to perform deblocking, it may be determined whether the deblocking filter is applied to a current block based on pixels included in a few rows or columns in a block. In case the deblocking filter applies to a block, a strong filter or a weak filter may be applicable depending on a necessary deblocking filtering strength. Further, upon application of the deblocking filter, a horizontal direction filtering and a vertical direction filtering may be performed in parallel when a vertical filtering and a horizontal filtering are performed.

The SAO may correct an offset between an original image and an image that has undergone deblocking on a per-pixel basis. In order to perform offset correction on a specific picture, a method of dividing pixel values included in an image into a predetermined number of areas, conducting an area where offset is conducted, and then applying the offset to the corresponding area or a method of applying the offset, considering edge information of each pixel, may be adopted.

The ALF (Adaptive Loop Filtering) may be carried out based on a value obtained by comparing an original image and a filtered restored image or an image that has undergone offset correction. Pixels included in an image may be divided into a predetermined groups, and a filter to be applicable to the corresponding group may be then determined, and so, a differential filtering may be carried out for each group. In relation to Information regarding whether to apply the ALF, a brightness signal may be transmitted for each coding unit (CU), and the shape and filter coefficient of an ALF filter to be used may vary depending on each block. Further, the same type (a fixed type) of an ALF filter may be applicable irrespective of characteristics of a target block.

The memory 155 may store a restored block or picture produced through the filter module 150. The stored restored block or picture may be provided to the predicting modules 120 and 125 when inter prediction is performed.

Figure 2:
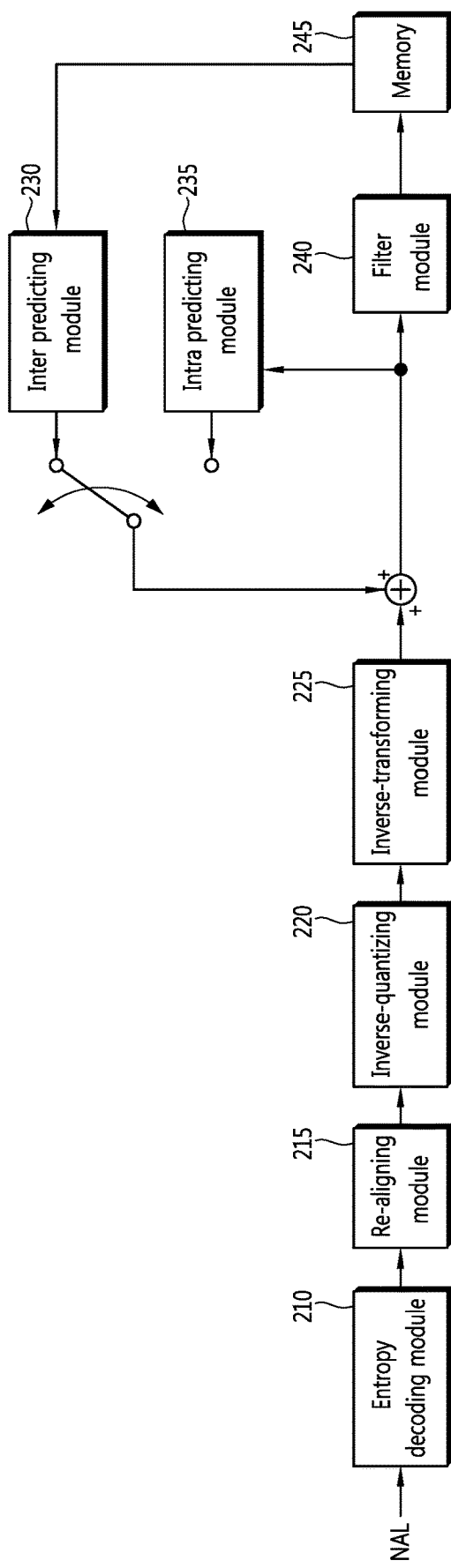
FIG. 2 is a block diagram illustrating an image decoding apparatus according to an embodiment of the present invention.

FIG. 2 is a block diagram illustrating an image decoding apparatus according to an embodiment of the present invention.

Referring to FIG. 2, the image decoder 200 includes an entropy decoding module 210, a re-aligning module 215, an inverse-transforming module 225, predicting modules 230 and 235, a filter module 240, and a memory 245.

An image bit stream input from the image encoder may be decoded in an opposite process of that of the image encoder.

The entropy decoding module 210 may perform entropy decoding in an opposite process of that of the entropy encoding that has been performed in the entropy encoding unit of the image encoder. For example, corresponding to the scheme performed in the image encoder, various schemes, such as Exponential Golomb, CAVLC (Context-Adaptive Variable Length Coding), and CABAC (Context-Adaptive Binary Arithmetic Coding), may be applicable.

The entropy decoding module 210 may decode information relating to the intra prediction and inter prediction performed in the encoder.

The re-aligning module 215 may re-align the bit stream entropy-decoded in the entropy decoding module 210 based on the method that has been performed in the encoding unit for re-alignment. Coefficients represented in the form of one-dimensional vectors may be restored back to 2D block-type coefficients and may be then realigned. The re-aligning module 215 may receive information relating to the coefficient scanning performed in the encoding unit and may perform re-alignment through a method of inversely performing scanning based on a scanning order in which the corresponding encoding unit has performed scanning.

The inverse-quantization module 220 may perform inverse quantization based on a coefficient of a re-aligned block and a quantization parameter provided from the encoder.

The inverse-transforming module 225 may perform inverse transform on an inverse quantized block. Examples of the inverse transform may include inverse DCT and inverse DST that respectively correspond to the DCT and DST that have been done in the transforming unit of the image encoder. In the transforming unit of the image encoder, DCT and DST may be selectively performed depending on a plurality of types of information, such as a prediction method, size of the current block and prediction direction, and in the inverse-transforming module 225 of the decoder, inverse-transform may be also performed depending on whether it is a brightness component/color component, block size, and prediction mode, corresponding to the DCT/DST performed in the image encoder.

The predicting modules 230 and 235 may generate a prediction block based on prediction block generation-related information provided from the entropy decoding module 210 and information on a previously decoded block or picture as provided from the memory 245.

As described above, when intra prediction is performed like in the image encoder, in case the prediction unit is the same in size as the transform unit, intra prediction is conducted on a prediction unit based on a pixel positioned at a left side or a left and lower side of the prediction unit, a pixel positioned at a left and upper side thereof, and a pixel positioned at an upper side or an upper and right side thereof. However, in case, upon performing intra prediction, the size of the prediction unit differs from the size of the transform unit, intra prediction may be carried out using a reference pixel based on the transform unit. Further, the coding unit may be generally identical in size to the prediction unit, and intra prediction may be adopted that performs N×N prediction unit splitting only on a minimum coding unit.

The predicting modules 230 and 235 may include a prediction unit determining unit, an inter predicting unit, and intra predicting unit. The prediction unit determining unit may receive various types of information, such as unit information, prediction mode information of an intra prediction method, and motion prediction-related information of an intra prediction method, as input from the entropy decoding module 210, may differentiate prediction units in a current coding unit, and may determine whether a prediction unit is subjected to intra prediction or inter prediction. The inter predicting module 230 may perform inter prediction on the current prediction unit based on information included in at least one of a previous picture and a subsequent picture of a current picture including the current prediction unit by using information necessary for inter prediction of the current prediction unit provided from the image encoder.

It may be determined which one of a skip mode, a merge mode, and an AMVP mode is the motion prediction method of a prediction unit included in a corresponding coding unit with respect to the coding unit in order to perform inter prediction.

The intra predicting module 235 may generate a prediction block based on pixel information in the current picture. In case the prediction unit has undergone intra prediction, intra prediction may be performed based on intra prediction mode information of the prediction unit provided from the image encoder. The intra predicting module 235 may include an AIS (Adaptive Intra Smoothing) filter and a reference pixel interpolating unit. The AIS filter performs filtering on a reference pixel of a current block. Depending on the prediction mode or block size of the current prediction unit, it may be determined whether to apply the filter and may be then applicable. AIS filtering may be carried out on the reference pixel of the current block using AIS filter information and prediction mode of the prediction unit provided from the image encoder. In case the prediction mode or size of the current block is a mode in which AIS filtering is not conducted, the AIS filter may not be applicable.

In case the prediction mode of the prediction unit is a prediction unit where intra prediction is performed based on a pixel value obtained by interpolating the reference pixel, the reference pixel interpolating unit may interpolate the reference pixel and may generate a reference pixel with a pixel unit less than an integer. In case the prediction mode of the current prediction unit is a prediction mode in which a prediction block is generated without interpolation of the reference pixel, the reference pixel may be not interpolated. The DC filter may generate a prediction block through filtering in case the prediction mode of the current block is a DC mode.

The restored block or picture may be provided to the filter module 240. The filter module 240 may apply deblocking filtering, SAO (Sample Adaptive Offset), or ALF (Adaptive Loop Filtering) to the restored block.

The SAO may perform offset correction on the restored image based on offset value information and type of the offset correction that has been applied to the image upon encoding.

The ALF may be applicable to a coding unit based on the whether-ALF-applies information or ALF coefficient information that is provided from the encoder. Such ALF information may be included in a specific parameter set and may be then provided.

The memory 245 may store a restored picture or block so that the restored picture or block may be used as a reference picture or a reference block or may provide the restored picture to an outputting unit.

Hereinafter, the block may mean a basis on which image encoding and decoding are performed. Accordingly, as used herein, the block may be, in some cases, used to refer to a coding unit (CU), prediction unit (PU), or transform unit (TU). Further, as used herein, the encoding/decoding target block may be used to denote both a transform/inverse-transform target block when transform/inverse-transform is performed and a prediction target block when prediction is performed.

Intra prediction may be performed based on an intra prediction mode of a current prediction unit (PU) (or, current PU or current prediction block), and an intra prediction mode may be encoded by the encoder and may be then transmitted to the decoder. At this time, the encoder may use a scheme of predicting an intra prediction mode so as to reduce the bit amount to be transmitted and to raise encoding efficiency.

Since the intra prediction mode of the current prediction unit is highly correlated with a prediction mode of a neighboring prediction unit (or, neighboring PU or neighboring block) adjacent to the current prediction unit, the encoder may encode the prediction mode of the current prediction unit using the prediction mode of the neighboring prediction unit. A mode predicted from the neighboring prediction unit adjacent to the current prediction unit is referred to as MPM (Most Probable Mode).

Figure 3:
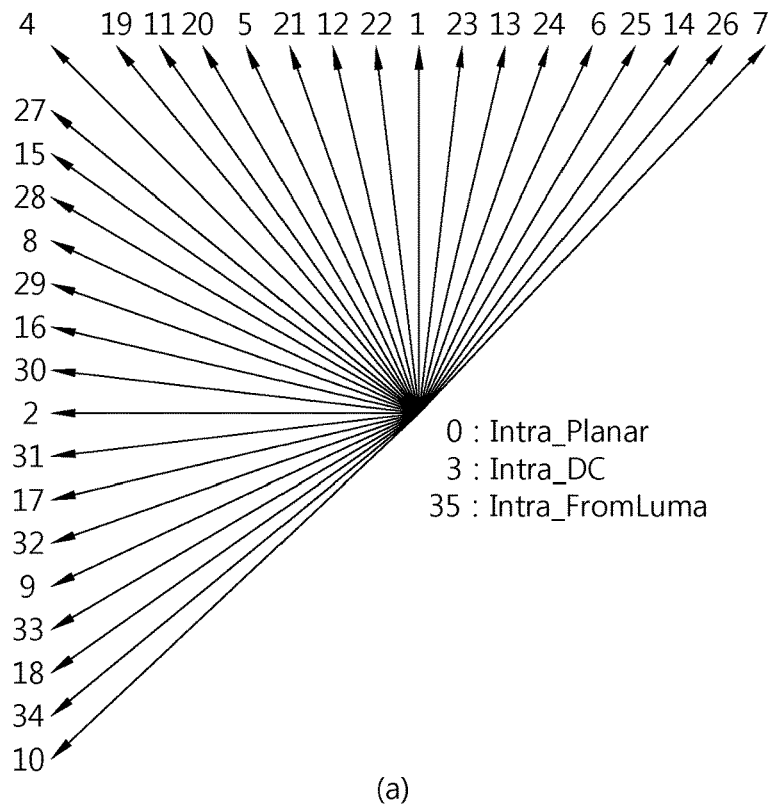
FIG. 3 is a conceptual view schematically illustrating an embodiment of a prediction direction of an intra prediction mode and a mode value assigned to each prediction direction.
Figure 3:
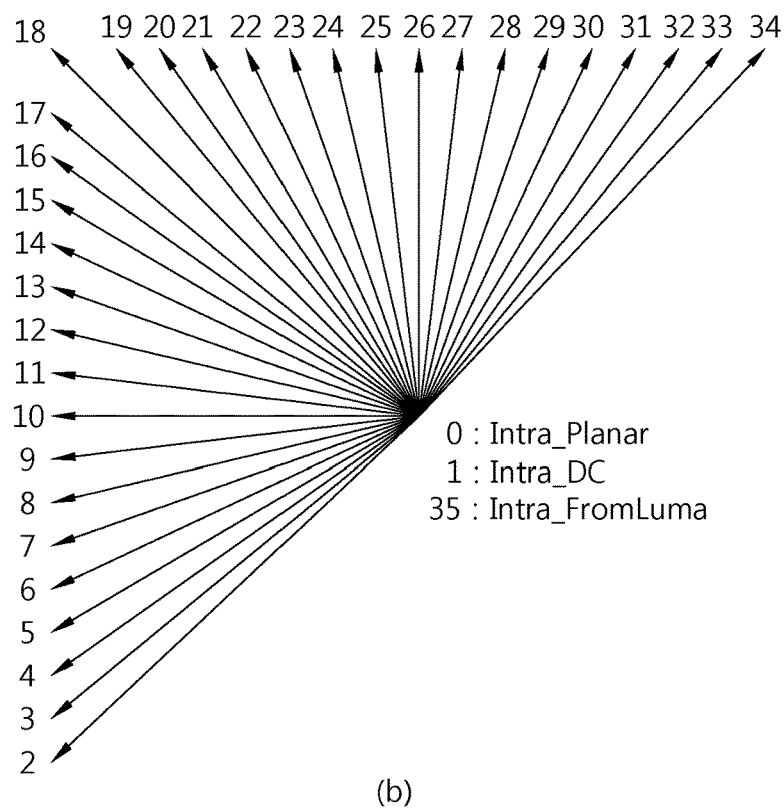

FIG. 3 is a conceptual view schematically illustrating an embodiment of a prediction direction of an intra prediction mode and a mode value assigned to each prediction direction. (a) and (b) of FIG. 3 each show a plurality of intra prediction modes which have different directivities, respectively. Further, the intra prediction modes are assigned with different mode values, respectively. For example, mode values as shown in (a) of FIG. 3 or as shown in (b) of FIG. 3 may be assigned to the intra prediction modes, respectively.

HEVC (High Efficiency Video Coding) intra prediction, which is now in process of standardization, provides a total of 35 prediction modes 0 to 34 as shown in (a) and (b) of FIG. 3, and each prediction mode may have a different mode value.

For example, prediction modes may exist that do not consider directivity, such as a planar mode (for example, when the mode values in (a) and (b) of FIG. 3 are 0) and a DC mode (for example, when the mode value in (a) of FIG. 3 is 3 or when the mode value in (b) of FIG. 3 is 1). Further, prediction modes may exist that have directivity, such as a prediction mode having vertical directivity (for example, when the mode value in (a) of FIG. 3 is 1 or when the mode value in (b) of FIG. 3 is 26) and a prediction mode having horizontal directivity (for example, when the mode value in (a) of FIG. 3 is 2 or when the mode value in (b) of FIG. 3 is 10).

The encoder performs intra prediction on the current prediction unit based on 35 prediction modes as shown in FIG. 3 and encodes the intra prediction mode information used for prediction. At this time, the encoder may derive an MPM from a neighboring prediction unit adjacent to the current prediction unit and may encode the intra prediction mode information of the current prediction unit based on the derived MPM in order to enhance encoding efficiency.

Figure 4:
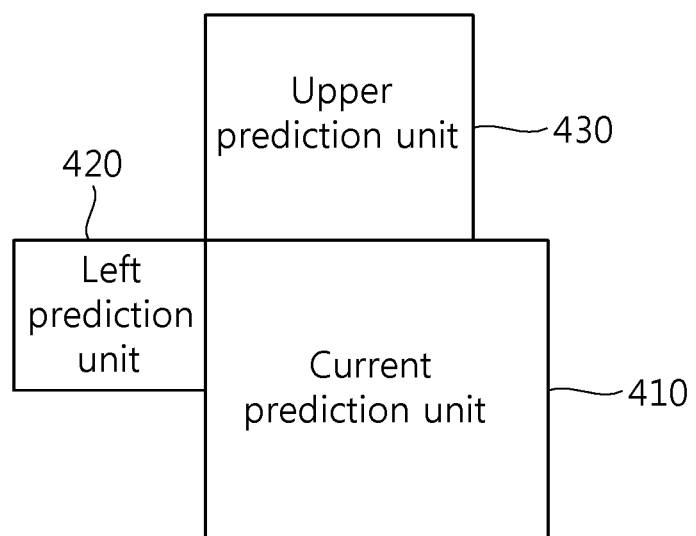
FIG. 4 is a conceptual view schematically illustrating an embodiment of a neighboring prediction unit used for deriving an MPM.

FIG. 4 is a conceptual view schematically illustrating an embodiment of a neighboring prediction unit used for deriving an MPM.

Referring to FIG. 4, the encoder and/or decoder may utilize at least one or more of neighboring prediction units that are spatially adjacent to a current prediction unit 410 so as to derive an MPM used for encoding and/or decoding an intra prediction mode of the current prediction unit 410.

For example, the encoder and/or decoder may use, as neighboring prediction units, a left prediction unit 420 adjacent to a left side of the current prediction unit 410 and an upper prediction unit 430 adjacent to an upper side of the current prediction unit 410. At this time, a prediction mode of the left prediction unit 420 and a prediction mode of the upper prediction unit 430 may be derived as MPMs.

Figure 5:
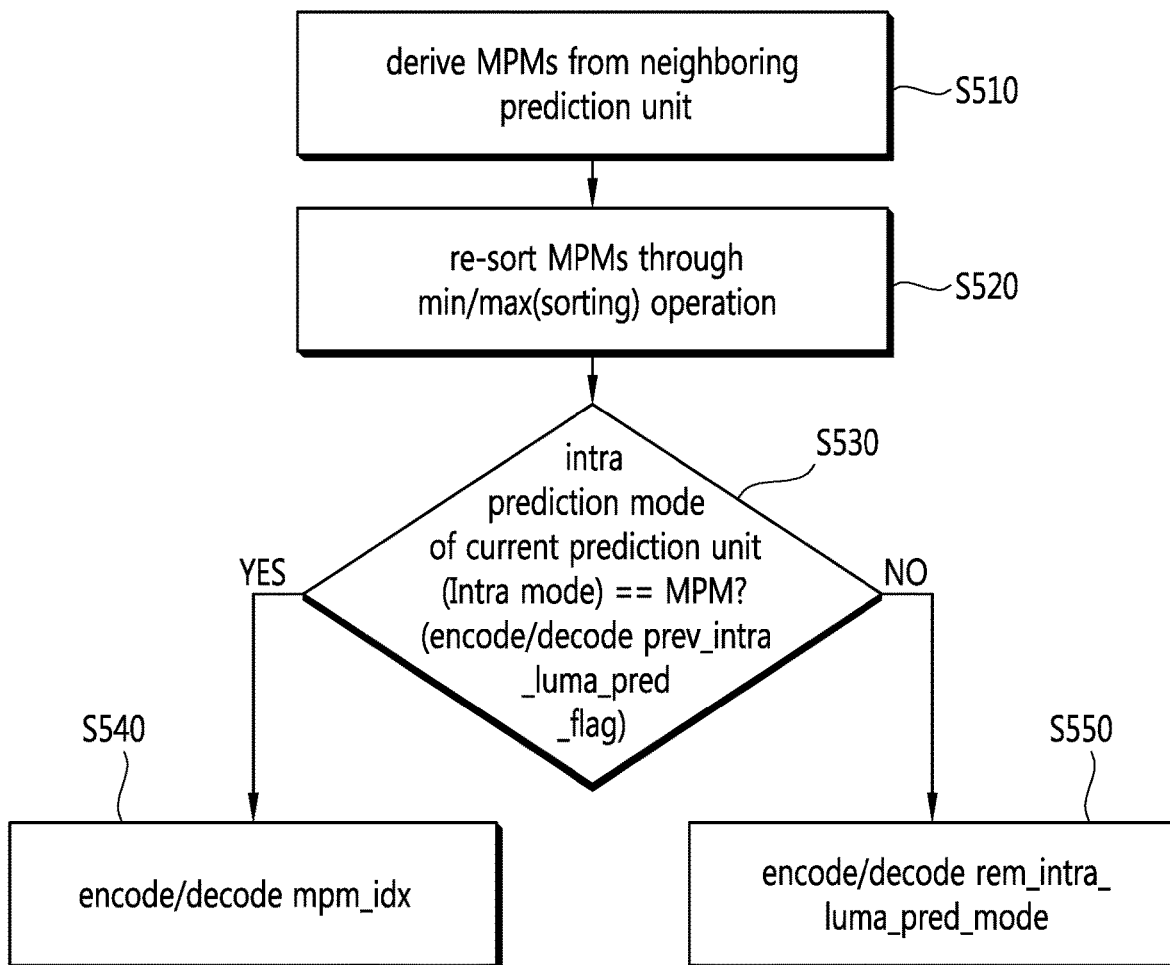
FIG. 5 is a flowchart schematically illustrating an encoding and/or decoding method of an intra prediction mode.

FIG. 5 is a flowchart schematically illustrating an encoding and/or decoding method of an intra prediction mode, and FIG. 6 shows an example of syntax schematically illustrating an encoding and/or decoding method of an intra prediction mode as shown in FIG. 5.

Referring to FIG. 5, the encoder and/or decoder derives an MPM from a neighboring prediction unit adjacent to a current prediction unit (S510).

For example, the neighboring prediction unit, as shown in FIG. 4, may be a left prediction unit adjacent to a left side of the current prediction unit and an upper prediction unit adjacent to an upper side of the current prediction unit. At this time, an intra prediction mode of the left prediction unit and an intra prediction mode of the upper prediction unit may be derived as MPMs. A specific method of deriving an MPM from a neighboring prediction unit will be described below with reference to FIG. 7.

The encoder and/or decoder sorts derived MPMs depending on mode values (S520). For example, in case two MPMs are derived from the left prediction unit and the upper prediction unit, min/max operation may be carried out based on mode values of the MPMs and may sort the two MPMs based on the mode values.

The encoder and/or decoder determines whether there is, among the derived MPMs, an MPM having the same prediction mode as the intra prediction mode of the current prediction unit (S530). At this time, the encoder and/or decoder may encode and/or decode a flag indicating whether there is, among the derived MPMs, an MPM having the same prediction mode as the intra prediction mode of the current prediction unit. The flag is hereinafter denoted as an MPM flag. For example, the MPM flag may be prev_intra_luma_pred_flag (610 in FIG. 6). In case, among the derived MPMs, an MPM exists that has the same prediction mode as the intra prediction mode of the current prediction unit, the MPM flag may have a value of 1, and the MPM flag value may be otherwise 0.

In case, among the derived MPMs, there is an MPM having the same prediction mode as the intra prediction mode of the current prediction unit, the encoder and/or decoder encodes and/or decodes an index indicating which MPM of the derived MPMs has the same prediction mode as the intra prediction mode of the current prediction unit (S540). Hereinafter, the index is referred to as an MPM index. For example, the MPM index may be mpm_idx (620 in FIG. 6). In case the intra prediction mode for the current prediction unit is encoded and/or decoded using the MPM index, encoding efficiency may be increased.

In case, among the derived MPMs, no MPM exists that has the same prediction mode as the intra prediction mode of the current prediction unit, the encoder and/or decoder encodes and/or decodes the intra prediction mode of the current prediction unit using remaining intra prediction modes (or remaining prediction modes or remaining modes) (S550). For example, a remaining intra prediction mode may be rem_intra_luma_pred_mode (630 in FIG. 6).

The encoder and/or decoder may encode and/or decode the remaining intra prediction modes using the remaining intra prediction modes except the derived MPMs so as to encode and/or decode the remaining intra prediction modes with a smaller number of bits. For example, among a maximum of 35 intra prediction modes having mode values 0 to 34 as shown in FIG. 3, the remaining intra prediction modes except the two derived MPMs may be re-sorted as having mode values 0 to 32, and the resorted intra prediction modes may be utilized to encode and/or decode the remaining intra prediction modes (for example, rem_intra_luma_pred_mode), thereby enhancing encoding efficiency.

Figure 7:
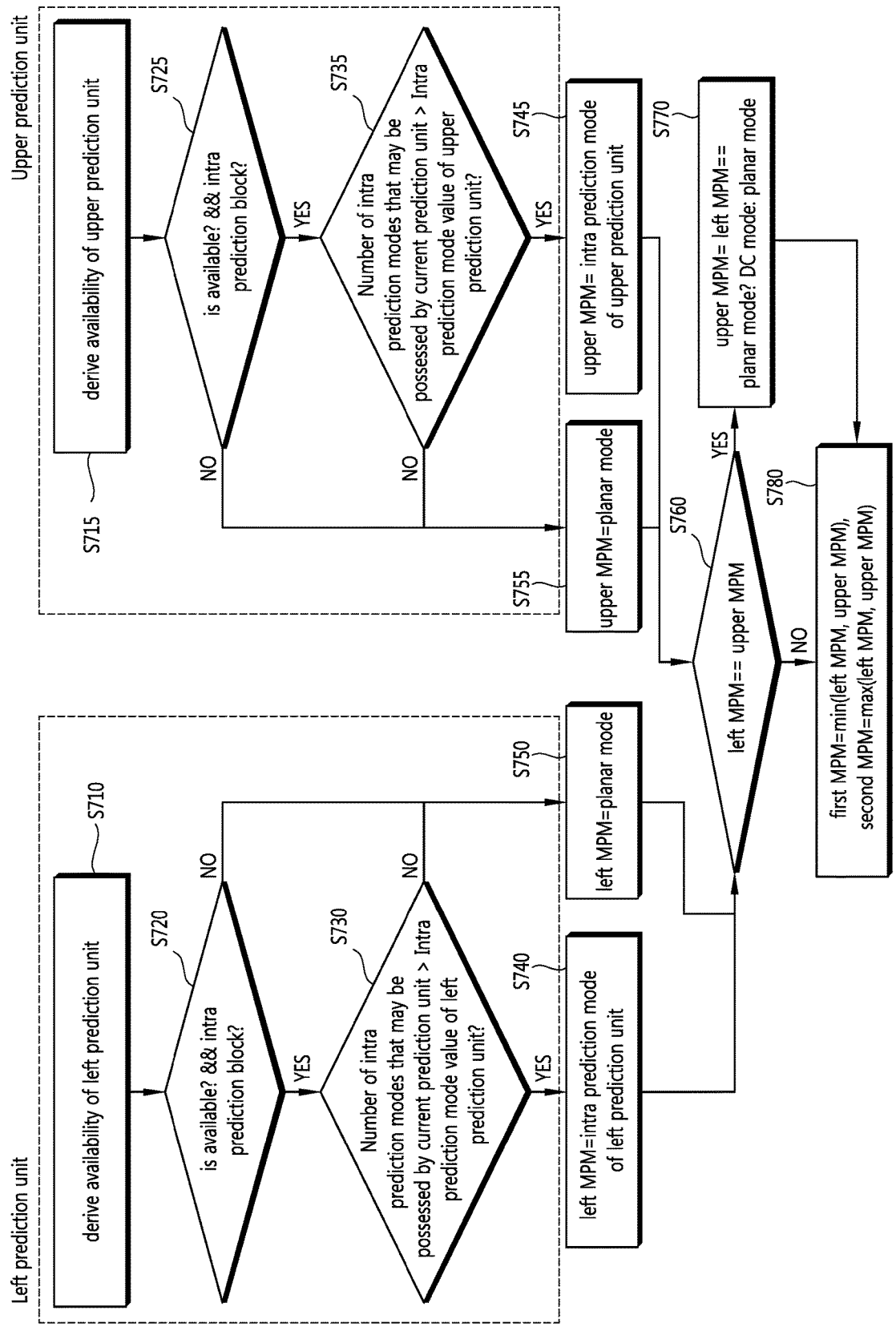
FIG. 7 is a flowchart schematically illustrating a method of deriving an MPM from a neighboring prediction unit.

FIG. 7 is a flowchart schematically illustrating a method of deriving an MPM from a neighboring prediction unit.

Neighboring prediction units are blocks spatially adjacent to a current prediction unit, and in the embodiment of FIG. 7, a left prediction unit adjacent to a left side of the current prediction unit and an upper prediction unit adjacent to an upper side of the current prediction unit, as shown in FIG. 4, are assumed as neighboring prediction units.

Referring to FIG. 7, the encoder derives availability from each of the left prediction unit and the upper prediction unit (S710 and S715).

In case the left prediction unit has encoding information and is an intra prediction block (S720), and the number of intra prediction modes that may be possessed by the current prediction unit is larger than the intra prediction mode value of the left prediction mode (S730), the encoder may derive an intra prediction mode of the left prediction unit as a left MPM (S740).

In such a way, in case the upper prediction unit has encoding information and is an intra prediction block (S725), and the number of intra prediction modes that may be possessed by the current prediction unit is larger than the intra prediction mode value of the upper prediction unit (S735), the encoder may derive an intra prediction mode of the upper prediction unit as an upper MPM (S745).

However, in case the left prediction unit does not satisfy the conditions of steps S720 and S730, in other words, when none of the three conditions (whether the neighboring prediction unit has encoding information, whether the neighboring prediction unit is an intra prediction block, and whether the number of intra prediction modes that may be possessed by the current prediction unit is larger than the intra prediction mode values of the neighboring prediction unit) are met (S720 and S730), the encoder may derive a planar mode as a left MPM (S750). Or, in case the upper prediction unit fails to satisfy the conditions of steps S725 and S735, that is, when none of the three conditions above are met (S725 and S735), the encoder may derive a planar mode as an upper MPM (S755).

At this time, the encoder may skip steps S730 and S735 in which it is determined whether the number of intra prediction modes that may be possessed by the current prediction unit is larger than the intra prediction mode values of the neighboring prediction unit (e.g., the left prediction unit and upper prediction unit).

The encoder derives two MPMs (e.g., left MPM and upper MPM) from the left prediction unit and the upper prediction unit as described above and then performs a duplication check to verify whether the two MPMs are the same (S760).

In case the left MPM is the same as the upper MPM, the encoder may derive the upper MPM in a DC mode if the left MPM is a planar mode and may derive the upper MPM as a planar mode if the left MPM is not a planar mode (S770).

When the left MPM is different from the upper MPM or after step S770 is done, the encoder may perform a sorting operation based on the mode values of the MPMs to thereby sort the two MPMs, e.g., in ascending order or descending order (S780).

For instance, a min/max operation may be performed on the left MPM and the upper MPM so that one of the two MPMs, which has a smaller mode value, may be derived as a first MPM, and the other of the two MPMs, which has a larger mode value, may be derived as a second MPM. At this time, the first MPM may be assigned with an MPM index value of 0, and the second MPM may be assigned with an MPM index value of 1.

Although the MPM deriving method according to the embodiment of FIG. 7 has been described as being performed in the encoder, the MPM deriving method may be likewise applicable to the decoder. Accordingly, a description of a method of deriving an MPM in the decoder will be skipped.

Figure 8:
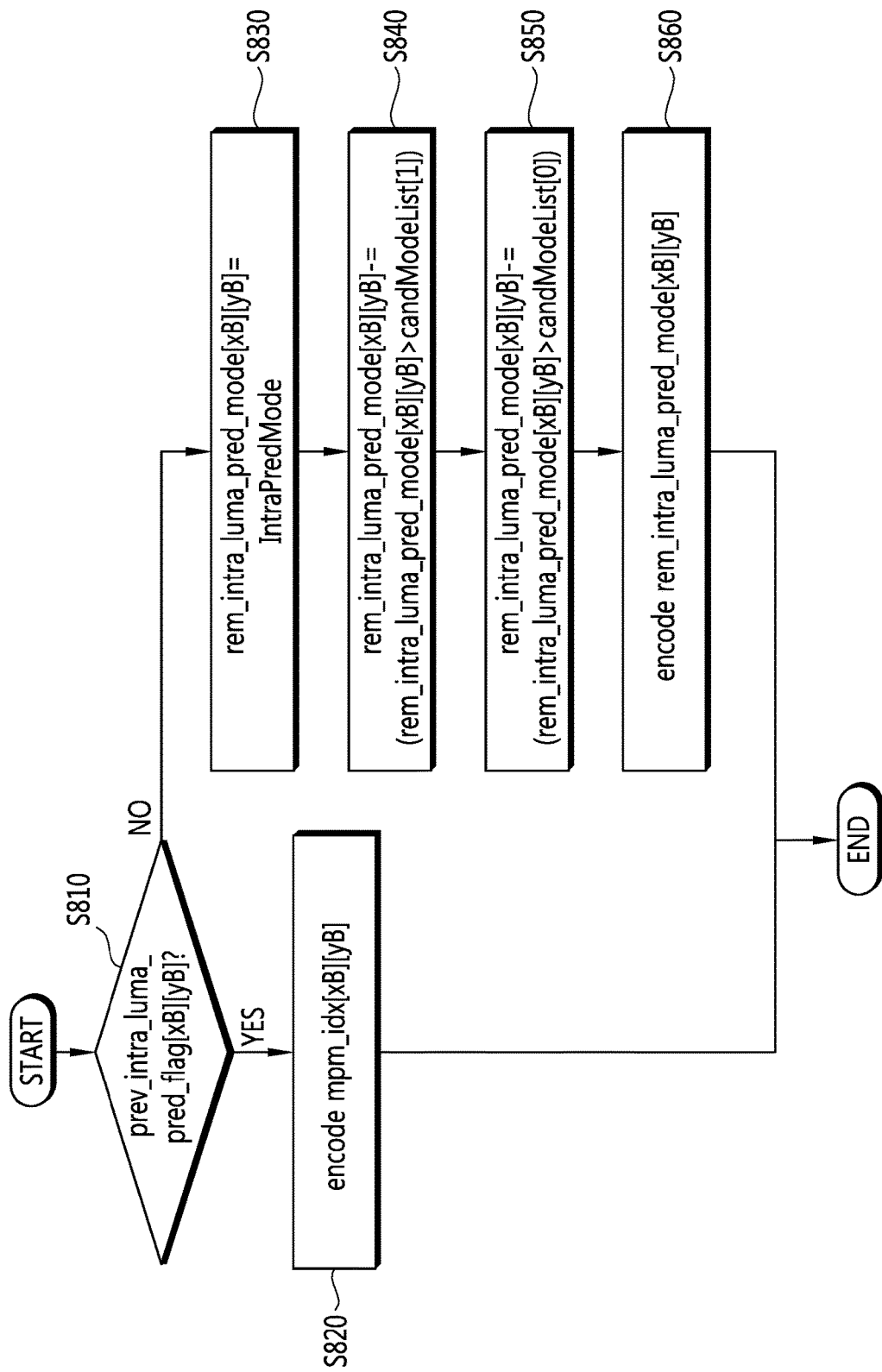
FIG. 8 is a flowchart schematically illustrating an example of a method of encoding an MPM index and a remaining intra prediction mode in case an intra prediction mode encoding method as illustrated in FIG. 5 applies.

FIG. 8 is a flowchart schematically illustrating an example of a method of encoding an MPM index and a remaining intra prediction mode in case an intra prediction mode encoding method as illustrated in FIG. 5 applies.

In the embodiment of FIG. 8, it is assumed, for convenience of description, that two MPMs are derived from a neighboring prediction unit. For example, as described above in connection with FIG. 7, a first MPM and a second MPM may be derived. The embodiment of FIG. 8 may also be applicable to the case where three or more MPMs are introduced.

Referring to FIG. 8, the encoder may determine whether there is, among MPMs derived from a neighboring prediction unit, an MPM having the same prediction mode as an intra prediction mode of a current prediction unit and may encode it using an MPM flag (S810). For example, the MPM flag may be prev_intra_luma_pred_flag. In case there is, among the derived MPMs, an MPM having the same prediction mode as the intra prediction mode of the current prediction unit, the MPM flag value may be 1, and the MPM flag value may be otherwise 0.

In case there is, among the MPMs derived from the neighboring prediction unit, an MPM having the same prediction mode as the intra prediction mode of the current prediction unit, the encoder may encode an MPM index indicating which one of the derived MPMs is the same as the intra prediction mode of the current prediction unit (S820). For instance, the MPM index may be mpm_idx.

Unless there is, among the MPMs derived from the neighboring prediction unit, an MPM having the same prediction mode as the intra prediction mode of the current prediction unit, the encoder may encode the remaining intra prediction modes. For example, a remaining intra prediction mode may be rem_intra_luma_pred_mode.

More specifically, the encoder puts a mode value (e.g., IntraPredMode) of an intra prediction mode derived from a current prediction unit in a remaining intra prediction mode (e.g., rem_intra_luma_pred_mode) (S830).

In case the value of a remaining intra prediction mode (e.g., rem_intra_luma_pred_mode) determined in step S830 is larger than a mode value (e.g., candModeList[1]) of a second MPM of the derived MPMs, the encoder reduces the remaining intra prediction mode (e.g., rem_intra_luma_pred_mode) by 1 (S840).

In case the value of a remaining intra prediction mode (e.g., rem_intra_luma_pred_mode) determined in step S840 is larger than a mode value (e.g., candModeList[0]) of a first MPM of the derived MPMs, the encoder reduces the remaining intra prediction mode (e.g., rem_intra_luma_pred_mode) by 1 (S850).

The encoder may encode a remaining intra prediction modes determined in steps S830 to S850 (e.g., rem_intra_luma_pred_mode) as a final intra prediction mode for the current prediction unit (S860).

Figure 9:
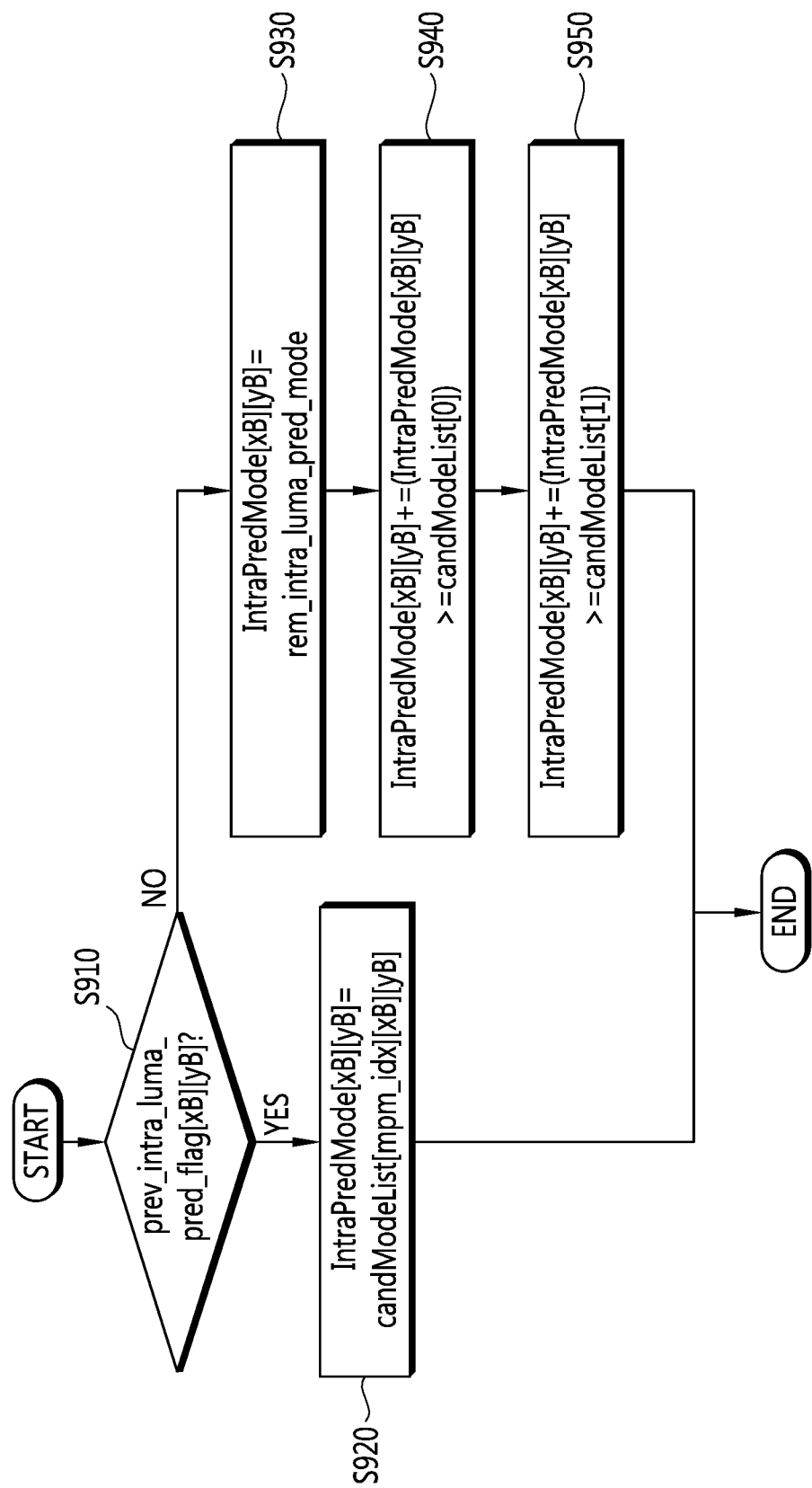
FIG. 9 is a flowchart schematically illustrating an example of a method of decoding an MPM index and a remaining intra prediction mode in case an intra prediction mode decoding method as illustrated in FIG. 5 applies.

FIG. 9 is a flowchart schematically illustrating an example of a method of decoding an MPM index and a remaining intra prediction mode in case an intra prediction mode decoding method as illustrated in FIG. 5 applies.

In the embodiment of FIG. 9, it is assumed, for convenience of description, that two MPMs are derived from a neighboring prediction unit. For example, as described above in connection with FIG. 7, a first MPM and a second MPM may be derived. The embodiment of FIG. 9 may be likewise applicable to the case where three or more MPMs are derived.

Referring to FIG. 9, the decoder may decode an MPM flag and may determine, based on the decoded MPM flag, whether there is, among MPMs derived from a neighboring prediction unit, an MPM having the same prediction mode as an intra prediction mode of a current prediction unit (S910). For example, the MPM flag may be prev_intra_luma_pred_flag. In case there is, among the derived MPMs, an MPM having the same prediction mode as the intra prediction mode of the current prediction unit, the MPM flag (e.g., prev_intra_luma_pred_flag) may have a value of 1, and the MPM flag (e.g., prev_intra_luma_pred_flag) may otherwise have a value of 0.

In case there is, among the derived MPMs, an MPM having the same prediction mode as the intra prediction mode of the current prediction unit, the decoder may decode an MPM index and may derive the intra prediction mode of the current prediction unit based on the decoded MPM index (S920). As described above, the MPM index is an index indicating which one of the derived MPMs is the same as the intra prediction mode of the current prediction unit. For example, the MPM index may be mpm_idx, and the MPM (e.g., candModeList[mpm_idx]) indicated by the MPM index (e.g., mpm_idx) may be derived as the intra prediction mode (e.g., IntraPredMode) of the current prediction unit.

In case there is, among the derived MPMs, no MPM having the same prediction mode as the intra prediction mode of the current prediction unit, the decoder may decode remaining intra prediction modes and may derive the intra prediction mode of the current prediction unit. As described above, the remaining intra prediction modes are prediction modes encoded using the remaining intra prediction modes except the MPM derived from the neighboring prediction unit. For example, a remaining intra prediction mode may be rem_intra_luma_pred_mode.

More specifically, the decoder decodes a remaining intra prediction mode (e.g., rem_intra_luma_pred_mode) and assigns the value of the decoded remaining intra prediction mode (e.g., rem_intra_luma_pred_mode) to the intra prediction mode (e.g., IntraPredMode) of the current prediction unit to be derived (S930).

If the value of the intra prediction mode (e.g., IntraPredMode) of the current prediction unit determined in step S930 is equal to or larger than the mode value (e.g., candModeList[0]) of a first MPM of the derived MPMs, the decoder increases the value of the intra prediction mode (e.g., IntraPredMode) of the current prediction unit by 1 (S940).

If the value of the intra prediction mode (e.g., IntraPredMode) of the current prediction unit determined in step S940 is equal to or larger than the mode value (e.g., candModeList[1]) of a second MPM of the derived MPMs, the decoder increases the value of the intra prediction mode (e.g., IntraPredMode) of the current prediction unit by 1 (S950).

The decoder may derive the intra prediction mode (e.g., IntraPredMode) of the current prediction unit determined in steps S930 to S950 as a final intra prediction mode for the current prediction unit.

As described above, upon encoding and/or decoding the intra prediction mode of the current prediction unit, an existing scheme derives MPMs from a neighboring block, performs a sorting operation such as min/max on the derived MPMs, and sorts the derived MPMs according to mode values of the MPMs. At this time, MPM indexes (e.g., mpm_idx) are assigned to the sorted MPMs. For example, in case two MPMs are derived, one of the two MPMs, which has a lower prediction mode value, may be assigned with an MPM index (e.g., mpm_idx) of 0 while the other of the two MPMs, which has a higher prediction mode value, may be assigned with an MPM index (e.g., mpm_idx) of 1. However, since the MPM index (e.g., mpm_idx) is entropy-encoded and/or decoded without consideration of a probability through a context-based binary arithmetic encoding bypass mode, a sorting process such as min/max for encoding and/or decoding the MPM index (e.g., mpm_idx) may not influence encoding efficiency but may rather increase complexity of encoding and/or decoding. Further, the existing scheme sorts MPMs always according to the mode values of MPMs irrespective of whether there is, among one or more MPMs derived from a neighboring prediction unit, an MPM having the same prediction mode as the intra prediction mode of the current prediction unit and thus performs an additional operation, thereby resulting in an increase in operation complexity.

Accordingly, the present invention provides a method of reducing operation complexity of an encoder and/or decoder by decreasing the number of times of performing a sorting operation such as min/max that is always carried out after MPMs are derived from a neighboring prediction unit adjacent to a current prediction unit when the intra prediction mode of the current prediction unit is encoded and/or decoded.

For this purpose, according to the present invention, when an intra prediction mode of a current prediction unit is encoded and/or decoded, one or more MPMs are first derived from a neighboring prediction unit, and MPM indexes (e.g., mpm_idx) are assigned to the derived MPMs in a predefined order irrespective of mode values of the derived MPMs. For example, an MPM derived from a left prediction unit may be assigned with an MPM index (e.g., mpm_idx) value of 0 while an MPM derived from an upper prediction unit may be assigned with an MPM index (e.g., mpm_idx) value of 1, and vice versa. Therefore, the present invention determines an order of MPMs index (e.g., mpm_idx) without considering the mode values of MPMs and thus stands simpler than an existing scheme in which MPMs are sorted by performing, e.g., a min/max operation and MPM indexes (e.g., mpm_idx) are then assigned.

At this time, in case there is, among one or more MPMs derived from a neighboring prediction unit, an MPM having the same prediction mode as an intra prediction mode of a current prediction unit, the intra prediction mode of the current prediction unit, according to the present invention, is encoded and/or decoded using MPM indexes (e.g., mpm_idx) assigned in a predefined order without respect to mode values of the derived MPMs. Unless there is, among one or more MPMs derived from a neighboring prediction unit, an MPM having the same prediction mode as the intra prediction mode of the current prediction unit, the MPM values are sorted, and remaining intra prediction mode (e.g., rem_intra_luma_pred_mode) values are determined based on mode values of the MPMs and are then encoded. In such scenario, the decoder derives an original intra prediction mode based on the value of a remaining intra prediction mode (e.g., rem_intra_luma_pred_mode).

Hereinafter, embodiments of the present invention are described in detail with reference to the accompanying drawings. In the embodiments of the present invention, it is assumed, for ease of description, that two MPMs are derived from a neighboring prediction unit adjacent to a current prediction unit. However, this is merely an example, and the present invention is not limited thereto. Further, although in the embodiments of the present invention the neighboring prediction units are a left prediction unit positioned at a left side of the current prediction unit and an upper prediction unit positioned at an upper side of the current prediction unit, various other neighboring prediction units spatially adjacent to the current prediction unit may be used to derive MPMs. Accordingly, the present invention may be generally expanded to encoding and/or decoding an intra prediction mode by deriving one or more MPMs from a neighboring prediction unit adjacent to the current prediction unit.

Figure 10:
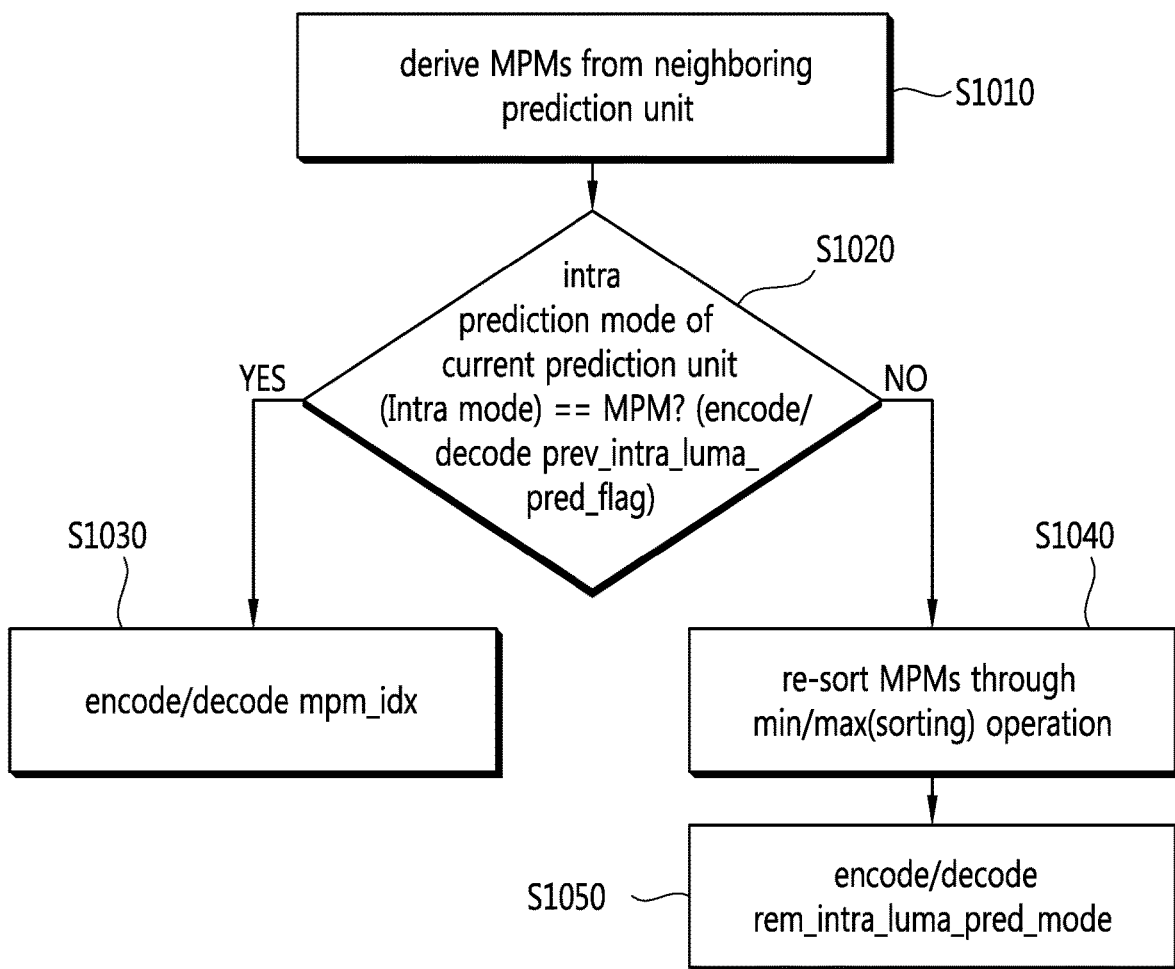
FIG. 10 is a flowchart schematically illustrating a method of encoding and/or decoding an intra prediction mode according to an embodiment of the present invention.

FIG. 10 is a flowchart schematically illustrating a method of encoding and/or decoding an intra prediction mode according to an embodiment of the present invention.

Referring to FIG. 10, the encoder and/or decoder derives an MPM from a neighboring prediction unit adjacent to a current prediction unit (S1010).

For example, the neighboring prediction units, as illustrated in FIG. 4, may be a left prediction unit adjacent to a left side of the current prediction unit and an upper prediction unit adjacent to an upper side of the current prediction unit. At this time, this time, an intra prediction mode of the left prediction unit and an intra prediction mode of the upper prediction unit may be derived as MPMs. According to an embodiment of the present invention, a specific method of deriving an MPM from a neighboring prediction unit will be described below with reference to FIGS. 11 and 12.

The encoder and/or decoder determines whether there is, among the derived MPMs, an MPM having the same prediction mode as the intra prediction mode of the current prediction unit (S1020). The encoder and/or decoder may encode and/or decode an MPM flag indicating whether there is, among the derived MPMs, an MPM having the same prediction mode as the intra prediction mode of the current prediction unit. For example, the MPM flag may be prev_intra_luma_pred_flag. In case there is, among the derived MPMs, an MPM having the same prediction mode as the intra prediction mode of the current prediction unit, the value of the MPM flag may be 1, and the value of the MPM flag may be otherwise 0.

There is, among the derived MPMs, an MPM having the same prediction mode as the intra prediction mode of the current prediction unit, the encoder and/or decoder may encode and/or decode an index indicating which one of the derived MPMs is the same as the intra prediction mode of the current prediction unit (S1030). As described above, the index may be an MPM index, e.g., mpm_idx.

Unless there is, among the derived MPMs, an MPM having the same prediction mode as the intra prediction mode of the current prediction unit, the encoder and/or decoder sorts the MPMs based on mode values of the MPMs (S1040). For example, in case two MPMs are derived from a left prediction unit and an upper prediction unit, the two MPMs may be sorted depending on the mode values through a sorting operation such as min/max operation based on the mode values of the MPMs.

And, the encoder and/or decoder may encode and/or decode the intra prediction mode of the current prediction unit using remaining intra prediction modes (S1050). For example, a remaining intra prediction mode may be rem_intra_luma_pred_mode. At this time, as described above, the encoder and/or decoder may derive the remaining intra prediction modes (e.g., rem_intra_luma_pred_mode) using the remaining intra prediction modes except the derived MPMs in order to encode and/or decode the remaining intra prediction modes with a smaller number of bits.

Figure 11:
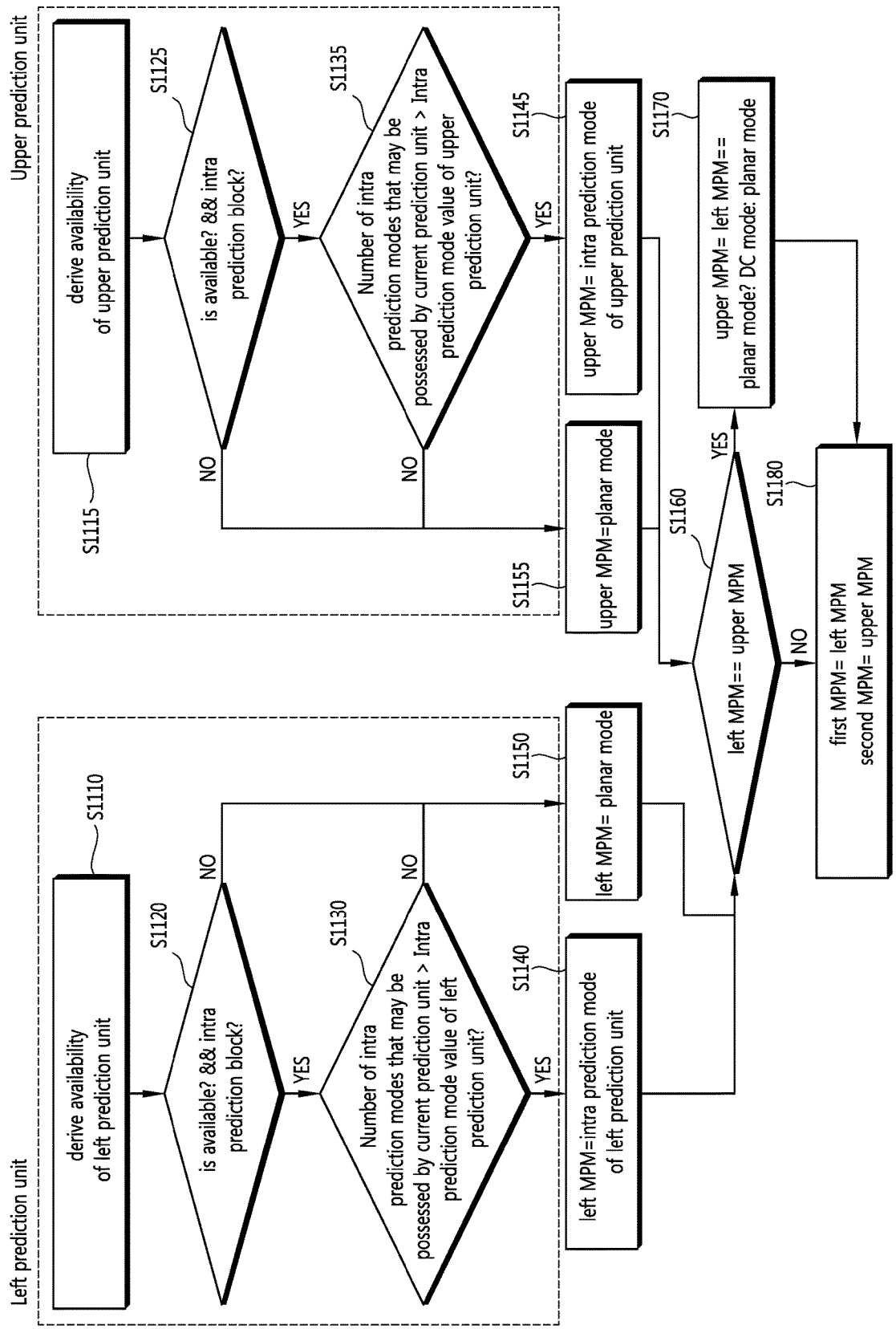
FIG. 11 is a flowchart schematically illustrating a method of deriving an MPM from a neighboring prediction unit according to an embodiment of the present invention.

FIG. 11 is a flowchart schematically illustrating a method of deriving an MPM from a neighboring prediction unit according to an embodiment of the present invention.

The neighboring prediction unit is a block spatially adjacent to a current prediction unit. In the embodiment of FIG. 11, a left prediction unit adjacent to a left side of the current prediction unit and an upper prediction unit adjacent to an upper side of the current prediction unit are assumed as neighboring prediction units as shown in FIG. 4.

Referring to FIG. 11, the encoder derives availability from each of the left prediction unit and the upper prediction unit adjacent to the current prediction unit (S1110 and S1115).

In case the left prediction unit has encoding information and is an intra prediction block (S1120), and the number of intra prediction modes that may be possessed by the current prediction unit is larger than the intra prediction mode value of the left prediction unit (S1130), the encoder may derive an intra prediction modes of the left prediction unit as a left MPM (S1140).

Similarly, in case the upper prediction unit is available and is an intra prediction block (S1125), and the number of intra prediction modes that may be possessed by the current prediction unit is larger than the intra prediction mode value of the upper prediction unit (S1135), the encoder may derive an intra prediction mode of the upper prediction unit as an upper MPM (S1145).

However, in case the left prediction unit fails to satisfy the conditions of steps S1120 and S1130, in other words, when none of the three conditions (whether the neighboring prediction unit is available, whether the neighboring prediction unit is an intra prediction block, and whether the number of intra prediction modes of the current prediction unit is larger than the intra prediction mode values of the neighboring prediction unit) are met (S1120 and S1130), the encoder may derive a planar mode as a left MPM (S1150). Or, in case the upper prediction unit fails to satisfy the conditions of steps S1125 and S1135, in other words, when none of the three conditions are met (S1125 and S1135), the encoder may derive a planar mode as an upper MPM (S1155).

At this time, the encoder may also skip steps S1130 and S1135 in which it is determined whether the number of intra prediction modes that may be possessed by the current prediction unit is larger than the intra prediction mode values of the neighboring prediction unit (e.g., left prediction unit and upper prediction unit).

The encoder derives two MPMs (e.g., left MPM and upper MPM) from the left prediction unit and the upper prediction unit as described above and then performs a duplication check to verify whether the two MPMs are the same (S1160).

In case the two MPMs (left MPM and upper MPM) are the same, the encoder may derive the upper MPM as a DC mode if the left MPM is a planar mode and may derive the upper MPM as a planar mode if the left MPM is not a planar mode (S1170).

After a duplication check is done on the two MPMs, that is when the two MPMs (left MPM and upper MPM) are different from each other or after step S1170 is performed, the encoder assigns MPM index (e.g., mpm_idx) values to the two MPMs (left MPM and upper MPM) in a predefined order irrespective of mode values of the MPMs (S1180).

For example, the left MPM may be derived as a first MPM, and the upper MPM may be derived as a second MPM. Or, the upper MPM may be derived as a first MPM, and the left MPM may be derived as a second MPM. The first MPM may be an MPM with an MPM index (e.g., mpm_idx) value assigned with 0, and the second MPM may be an MPM with an MPM index (e.g., mpm_idx) value assigned with 1.

Figure 12:
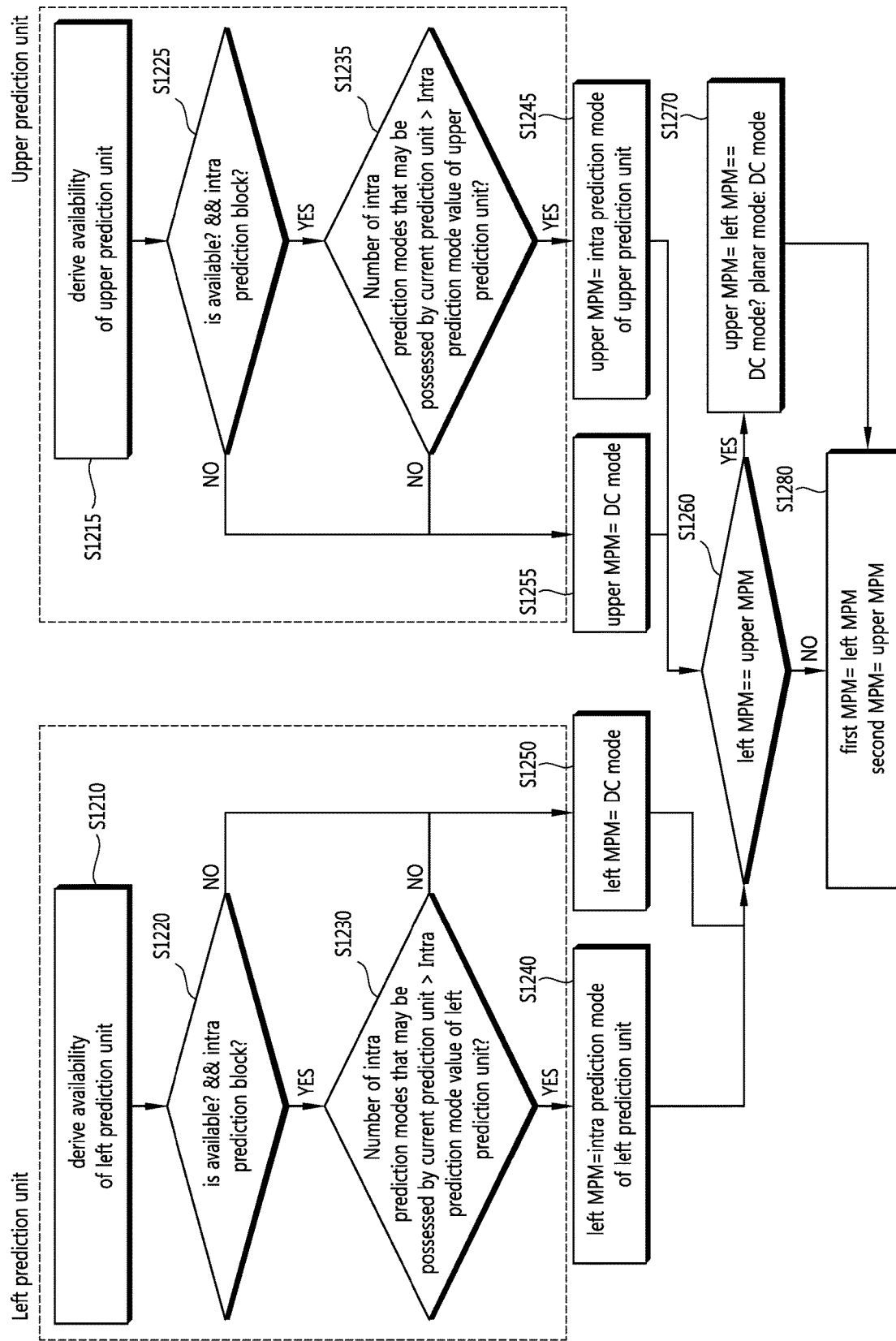
FIG. 12 is a flowchart schematically illustrating a method of deriving an MPM from a neighboring prediction unit according to another embodiment of the present invention.

FIG. 12 is a flowchart schematically illustrating a method of deriving an MPM from a neighboring prediction unit according to another embodiment of the present invention.

The neighboring prediction unit is a block spatially adjacent to a current prediction unit. In the embodiment of FIG. 12, a left prediction unit adjacent to a left side of the current prediction unit and an upper prediction unit adjacent to an upper side of the current prediction unit are assumed as neighboring prediction units as illustrated in FIG. 4.

Referring to FIG. 12, the encoder derives availability from each of the left prediction unit and the upper prediction unit adjacent to the current prediction unit (S1210 and S1215).

In case the left prediction unit is available and is an intra prediction block (S1220) and the number of intra prediction modes that may be possessed by the current prediction unit is larger than the intra prediction mode value of the left prediction unit (S1230), the encoder may derive an intra prediction mode of the left prediction unit as a left MPM (S1240).

Similarly, in case the upper prediction unit is available and is an intra prediction block (S1225) and the number of intra prediction modes that may be possessed by the current prediction unit is larger than the intra prediction mode value of the upper prediction unit (S1235), the encoder may derive an intra prediction mode of the upper prediction unit as an upper MPM (S1245).

However, in case the left prediction unit fails to satisfy the conditions of steps S1220 and S1230, in other words, when none of the three conditions (whether the neighboring prediction unit is available, whether the neighboring prediction unit is an intra prediction block, and whether the number of intra prediction modes that may be possessed by the current prediction unit is larger than the intra prediction mode values of the neighboring prediction unit) are met (S1220 and S1230), the encoder may derive a DC mode as the left MPM (S1250). Or, in case the upper prediction unit fails to satisfy the conditions of steps S1225 and S1235, in other words, when none of the three conditions are met (S1225 and S1235), the encoder may derive a DC mode as the upper MPM (S1255).

At this time, the encoder may also skip steps S1230 and S1235 in which it is determined whether the number of intra prediction modes that may be possessed by the current prediction unit is larger than the intra prediction mode values of the neighboring prediction unit (e.g., left prediction unit and upper prediction unit).

The encoder derives two MPMs (e.g., left MPM and upper MPM) from the left prediction unit and the upper prediction unit as described and then performs a duplication check to verify whether the two MPMs are the same (S1260).

In case the two MPMs (left MPM and upper MPM) are the same, the encoder may derive the upper MPM as a planar mode if the left MPM is a DC mode and may derive the upper MPM as a DC mode if the left MPM is not a DC mode (S1270).

After a duplication check is done on the two MPMs, in other words, when the two MPMs (left MPM and upper MPM) are different from each other or after step S1270 is performed, the encoder assigns MPM index (e.g., mpm_idx) values to the two MPMs (left MPM and upper MPM) in a predefined order irrespective of mode values of the MPMs (S1280).

For example, the left MPM may be derived as the first MPM, and the upper MPM may be derived as the second MPM. Or, the upper MPM may be derived as the first MPM, and the left MPM may be derived as the second MPM. The first MPM may be an MPM with an MPM index (e.g., mpm_idx) value assigned with 0, and the second MPM may be an MPM with an MPM index (e.g., mpm_idx) value assigned with 1.

It is described above in connection with FIGS. 11 and 12 that the encoder performs a method of deriving an MPM according to an embodiment of the present invention. The method of deriving an MPM according to an embodiment of the present invention may be likewise applicable to the decoder. Accordingly, a method of deriving an MPM in the decoder is not repeatedly described.

Meanwhile, in case the intra prediction mode encoding method described above in connection with FIG. 10 applies to encoding an MPM index and remaining intra prediction modes according to an embodiment of the present invention, the same method as in the embodiment described above in connection with FIG. 8 may be applicable. Accordingly, a method of encoding an MPM index and remaining intra prediction modes according to an embodiment of the present invention is not described.

Figure 13:
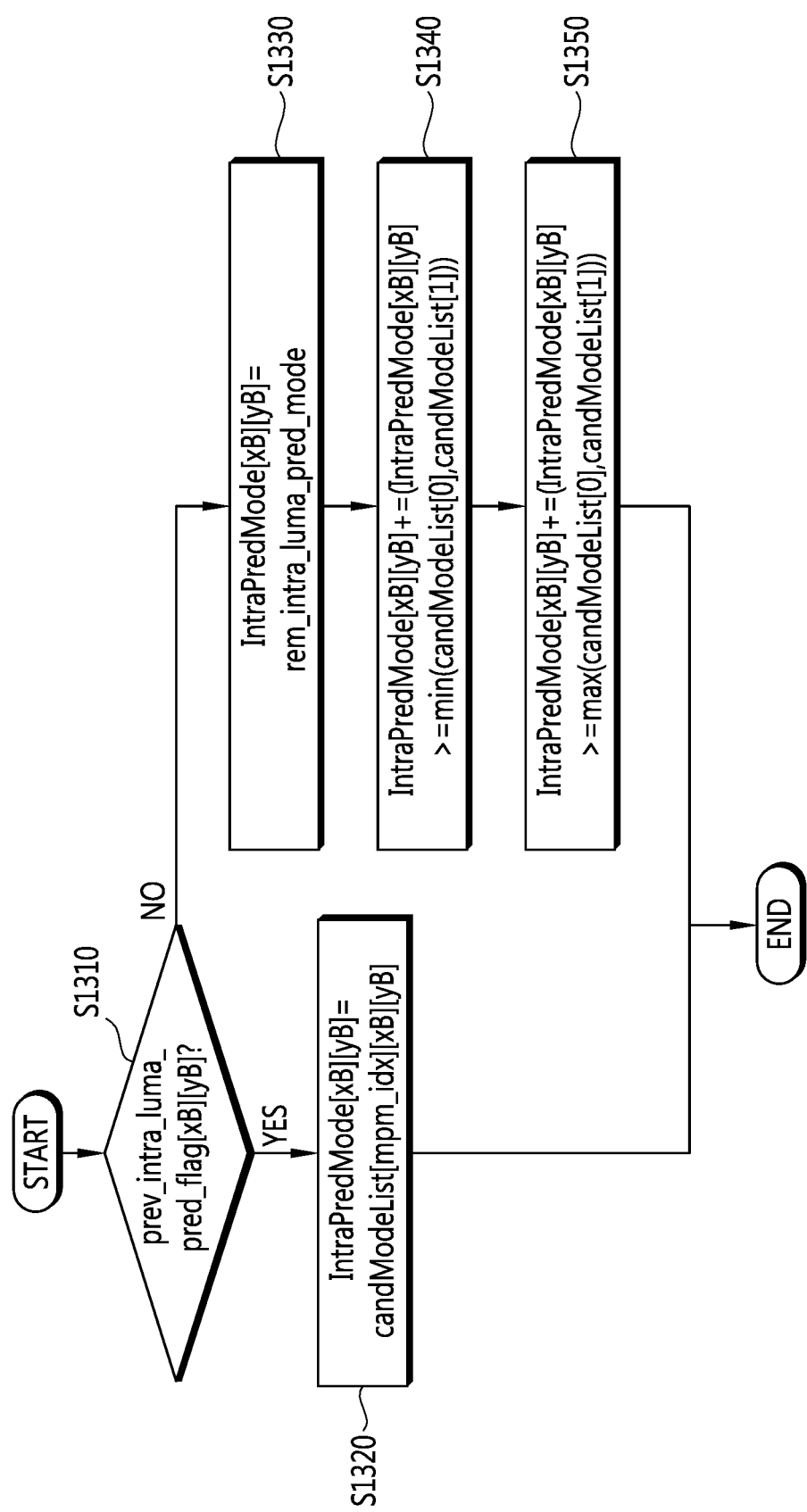
FIG. 13 is a flowchart schematically illustrating an example of a method of decoding an MPM index and remaining intra prediction modes according to the present invention in case the intra prediction mode decoding method described in connection with FIG. 10 applies.

FIG. 13 is a flowchart schematically illustrating an example of a method of decoding an MPM index and remaining intra prediction modes according to the present invention in case the intra prediction mode decoding method described in connection with FIG. 10 applies.

In the embodiment of FIG. 13, it is assumed, for ease of description, that two MPMs are derived from neighboring prediction units. For example, as described above in connection with FIG. 11 or 12, a first MPM with an MPM index value assigned with 0 and a second MPM with an MPM index value assigned with 1 may be derived. The embodiment of FIG. 13 may be also applicable to the case where three or more MPMs are derived.

Referring to FIG. 13, the decoder may decode an MPM flag and may determine whether there is, among MPMs derived from a neighboring prediction unit, an MPM having the same prediction mode as an intra prediction mode of a current prediction unit based on the decoded MPM flag (S1310). For example, the MPM flag may be prev_intra_luma_pred_flag. In case there is, among the derived MPMs, an MPM having the same prediction mode as the intra prediction mode of the current prediction unit, the MPM flag (e.g., prev_intra_luma_pred_flag) value may be 1, and the MPM flag (e.g., prev_intra_luma_pred_flag) may be otherwise 0.

In case there is, among the derived MPMs, an MPM having the same prediction mode as the intra prediction mode of the current prediction unit, the decoder may decode an MPM index and may derive the intra prediction mode of the current prediction unit based on the decoded MPM index (S1320). As described above, the MPM index is an index indicating which one of the derived MPMs is the same as the intra prediction mode of the current prediction unit. For instance, the MPM index may be mpm_idx, and an MPM (e.g., candModeList[mpm_idx]) indicated by the MPM index (e.g., mpm_idx) may be derived as the intra prediction mode (e.g., IntraPredMode) of the current prediction unit.

Unless there is, among the derived MPMs, an MPM having the same prediction mode as the intra prediction mode of the current prediction unit, the decoder may sort the derived MPMs according to mode values of the MPMs through a sorting operation, may decode the remaining intra prediction modes, and then may derive the intra prediction mode of the current prediction unit using the same. As described above, the remaining intra prediction modes are prediction modes encoded using the remaining intra prediction modes except the MPM derived from a neighboring prediction unit. For example, a remaining intra prediction mode may be rem_intra_luma_pred_mode.

More specifically, the decoder decodes the remaining intra prediction mode (e.g., rem_intra_luma_pred_mode) and assigns the decoded remaining intra prediction mode (e.g., rem_intra_luma_pred_mode) value to the intra prediction mode (e.g., IntraPredMode) of the current prediction unit (S1330).

If the value of the intra prediction mode (e.g., IntraPredMode) of the current prediction unit determined in step S1330 is equal to or larger than an MPM having a smaller mode value obtained through a sorting operation among the derived MPMs, the decoder increases the value of the intra prediction mode (e.g., IntraPredMode) of the current prediction unit by 1 (S1340). For example, two MPMs derived by the method as described in connection with FIG. 11 or FIG. 12, e.g., first MPM (candModeList[0]) and second MPM (candModeList[1]), may be subjected to a min operation, thereby obtaining an MPM having a smaller mode value of the two MPMs.

If the value of the intra prediction mode (e.g., IntraPredMode) of the current prediction unit determined in step S1340 is equal to or larger than an MPM having a larger mode value as obtained through a sorting operation among the derived MPMs, the decoder increases the value of the intra prediction mode (e.g., IntraPredMode) of the current prediction unit by 1 (S1350). For example, two MPMs derived by the method as described in connection with FIG. 11 or FIG. 12, e.g., first MPM (candModeList[0]) and second MPM (candModeList[1]), may be subjected to a max operation, thereby obtaining an MPM having a larger mode value of the two MPMs.

The decoder may derive the intra prediction mode (e.g., IntraPredMode) of the current prediction unit determined in steps S1330 to S1350 as a final intra prediction mode of the current prediction unit.

Since in the intra prediction mode encoding and/or decoding method according to the present invention a sorting operation is performed based on a mode value of an MPM only when there is, among MPMs derived from a neighboring prediction unit, no MPM having the same prediction mode as the intra prediction mode of the current prediction unit, encoding and/or decoding complexity may be reduced compared with an existing method in which a sorting operation is always performed based on a mode value of an MPM irrespective of presence or absence of an MPM having the same prediction mode as the intra prediction mode of the current prediction unit.

Table 1 below shows an example of a probability distribution for MPM flag (e.g., prev_intra_luma_pred_flag) values. Here, an MPM flag (e.g., prev_intra_luma_pred_flag) value being 0 represents that none of MPMs derived from a neighboring prediction unit have the same prediction mode as an intra prediction mode of a current prediction unit. An MPM flag (e.g., prev_intra_luma_pred_flag) being 1 means the case where there is, among MPMs derived from a neighboring prediction unit, an MPM having the same prediction mode as an intra prediction mode of a current prediction unit.

TABLE 1

| Class | Prev_intra_luma_pred_mode | |
|---|---|---|
| | 0 | 1 |
| A | 82.888449% | 17.111551% |
| B | 82.622066% | 17.377934% |
| C | 83.52761% | 16.47239% |
| D | 83.94132% | 16.05868% |
| E | 81.7966355% | 18.203365% |
| All | 82.955217% | 17.044783% |

Referring to Table 1, the probability in which the MPM flag (e.g., prev_intra_luma_pred_flag) value is 0 may be about 83%, and the probability in which the MPM flag (e.g., prev_intra_luma_pred_flag) value is 1 may be about 17%.

Accordingly, when the intra prediction mode encoding and/or decoding method according to the present invention as in the embodiment described in connection with FIG. 10 applies, only when the MPM flag (e.g., prev_intra_luma_pred_flag) value is 0, an MPM sorting process is carried out, and thus, the encoder and/or decoder may reduce the operation process for MPM sorting by about 17%.

A method is now described which may encode and/or decode a intra prediction mode without performing an MPM sorting operation irrespective of an MPM flag (e.g., prev_intra_luma_pred_flag) value, in other words, regardless of whether there is an MPM having the same prediction mode as an intra prediction mode of a current prediction unit among MPMs derived from a neighboring prediction unit.

Figure 14:
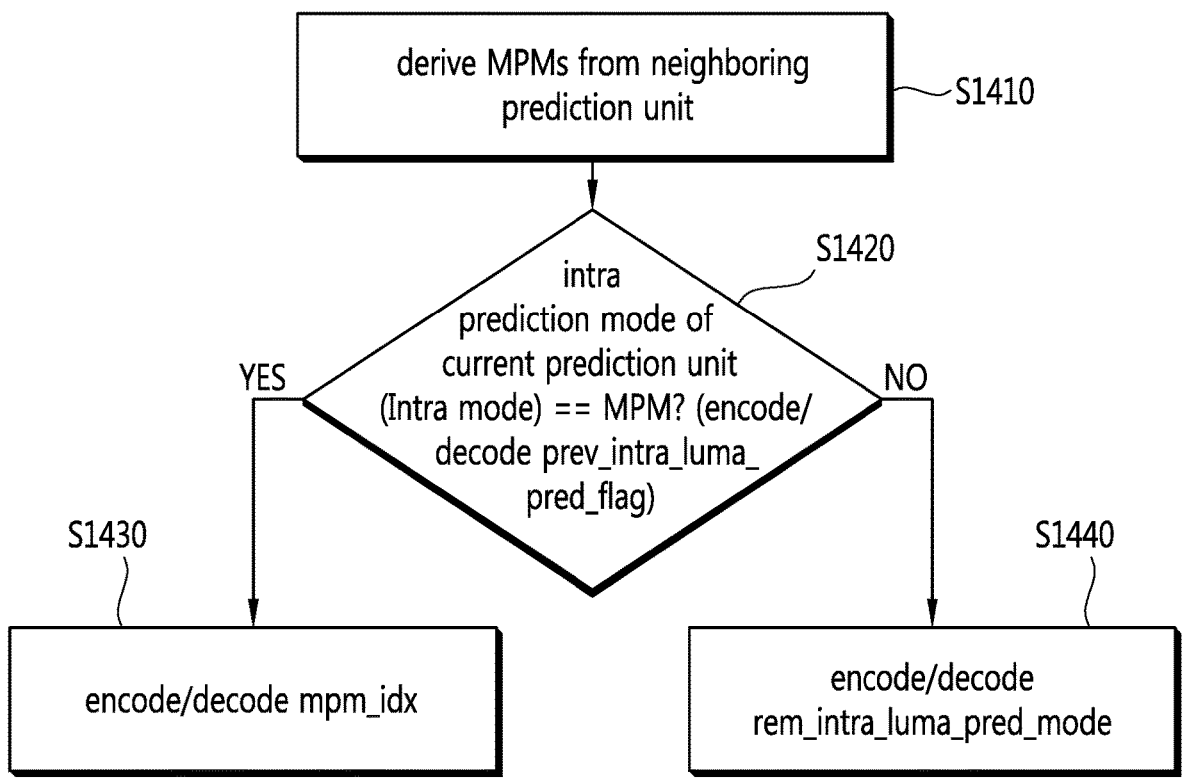
FIG. 14 is a flowchart schematically illustrating an intra prediction mode encoding and/or decoding method according to another embodiment of the present invention.

FIG. 14 is a flowchart schematically illustrating an intra prediction mode encoding and/or decoding method according to another embodiment of the present invention.

Referring to FIG. 14, the encoder and/or decoder derives MPMs from neighboring prediction units adjacent to a current prediction unit (S1410).

For example, the neighboring prediction units, as shown in FIG. 4, may be a left prediction unit adjacent to a left side of a current prediction unit and an upper prediction unit adjacent to an upper side of the current prediction unit. As illustrated in FIG. 11 or 12, MPMs may be derived from the left prediction unit and the upper prediction unit.

The encoder and/or decoder determines whether there is, among the derived MPMs, an MPM having the same prediction mode as the intra prediction mode of the current prediction unit (S1420). The encoder and/or decoder may encode and/or decode an MPM flag indicating whether there is, among the derived MPMs, an MPM having the same prediction mode as the intra prediction mode of the current prediction unit. For example, the MPM flag may be prev_intra_luma_pred_flag. In case there is, among the derived MPMs, an MPM having the same prediction mode as the intra prediction mode of the current prediction unit, the MPM flag value may be 1, and the MPM flag value may be otherwise 0.

In case there is, among the derived MPMs, an MPM having the same prediction mode as the intra prediction mode of the current prediction unit, the encoder and/or decoder may encode and/or decode an MPM index indicating which one of the derived MPMs is the same as the intra prediction mode of the current prediction unit (S1430). For example, the MPM index may be mpm_idx.

Unless there is, among the derived MPMs, an MPM having the same prediction mode as the intra prediction mode of the current prediction unit, the encoder and/or decoder may encode and/or decode the intra prediction mode of the current prediction unit using remaining intra prediction modes (S1440). For example, a remaining intra prediction mode may be rem_intra_luma_pred_mode. At this time, as described above, a remaining intra prediction mode (e.g., rem_intra_luma_pred_mode) may be derived considering mode values of the derived MPMs to reduce the number of bits necessary for encoding and/or decoding the remaining intra prediction mode (e.g., rem_intra_luma_pred_mode), and the derived remaining intra prediction mode may be encoded and/or decoded. For instance, a remaining intra prediction mode (e.g., rem_intra_luma_pred_mode) may be derived based on mode values of the remaining intra prediction modes except the derived MPMs.

Figure 15:
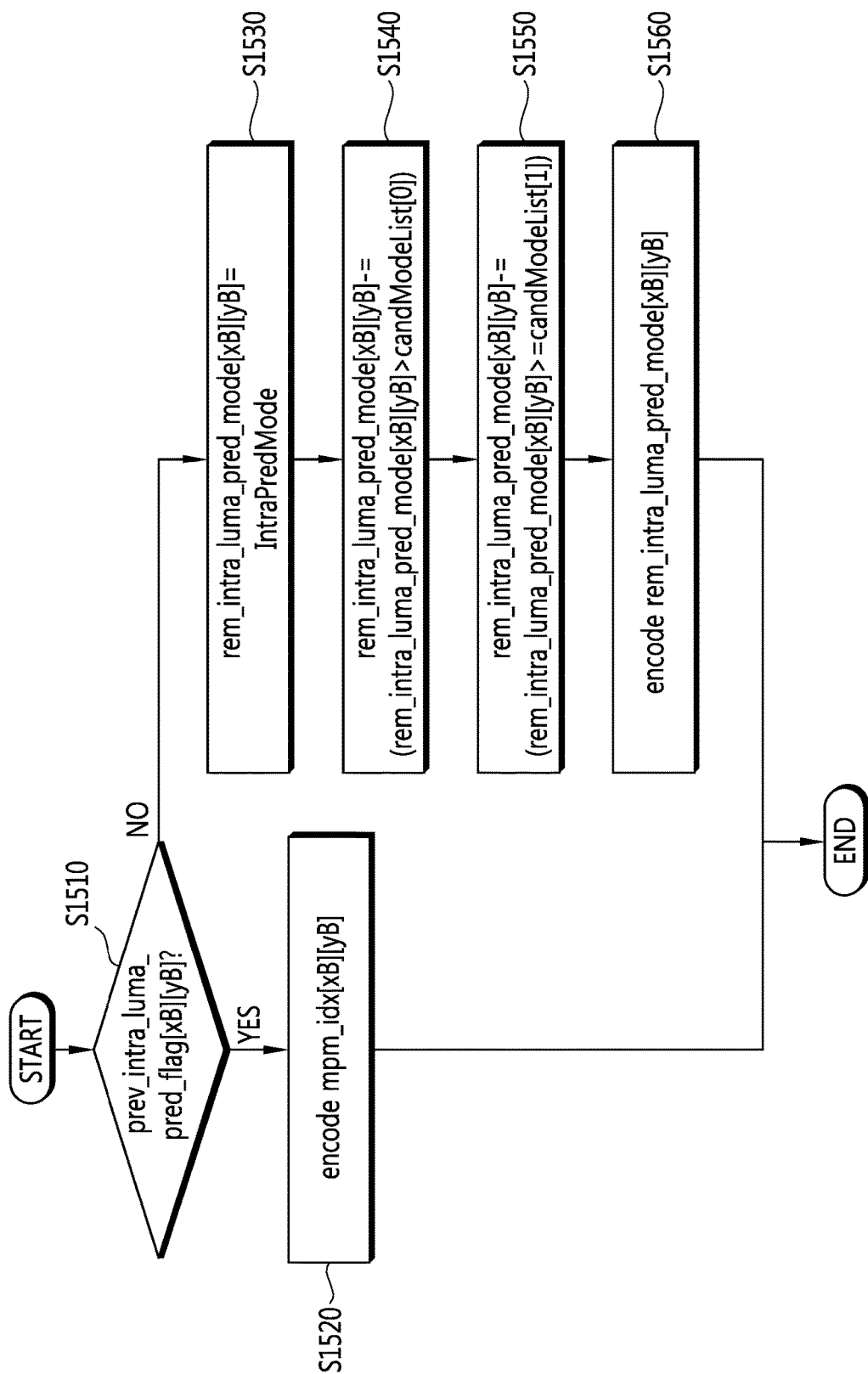
FIG. 15 is a flowchart schematically illustrating an example of a method of encoding an MPM index and a remaining intra prediction mode according to the present invention in case an intra prediction mode encoding method as described in connection with FIG. 14 applies.
Figure 16:
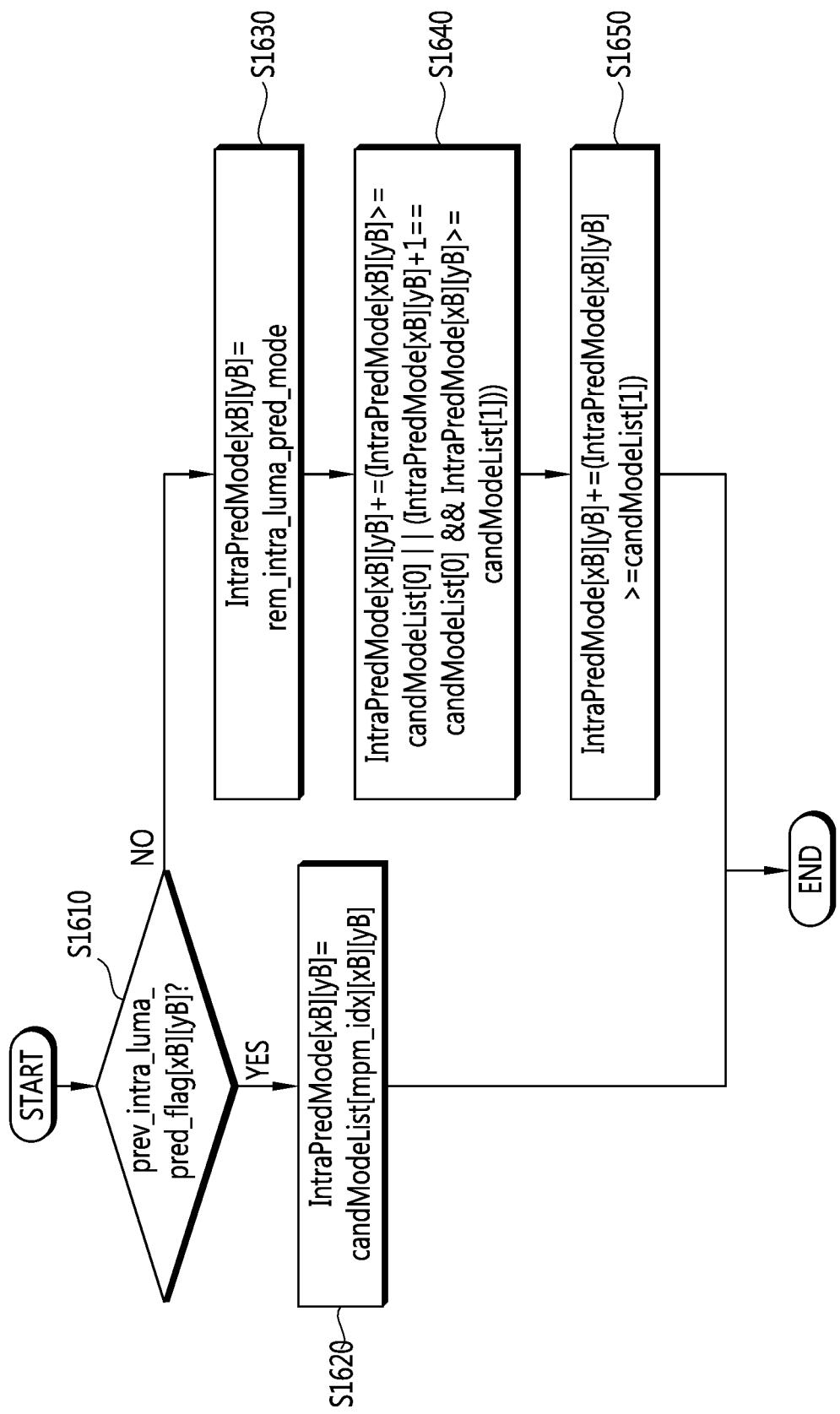
FIG. 16 is a flowchart schematically illustrating an example of a method of decoding an MPM index and remaining intra prediction modes according to the present invention in case the intra prediction mode decoding method described in connection with FIG. 14 applies.
Figure 17:
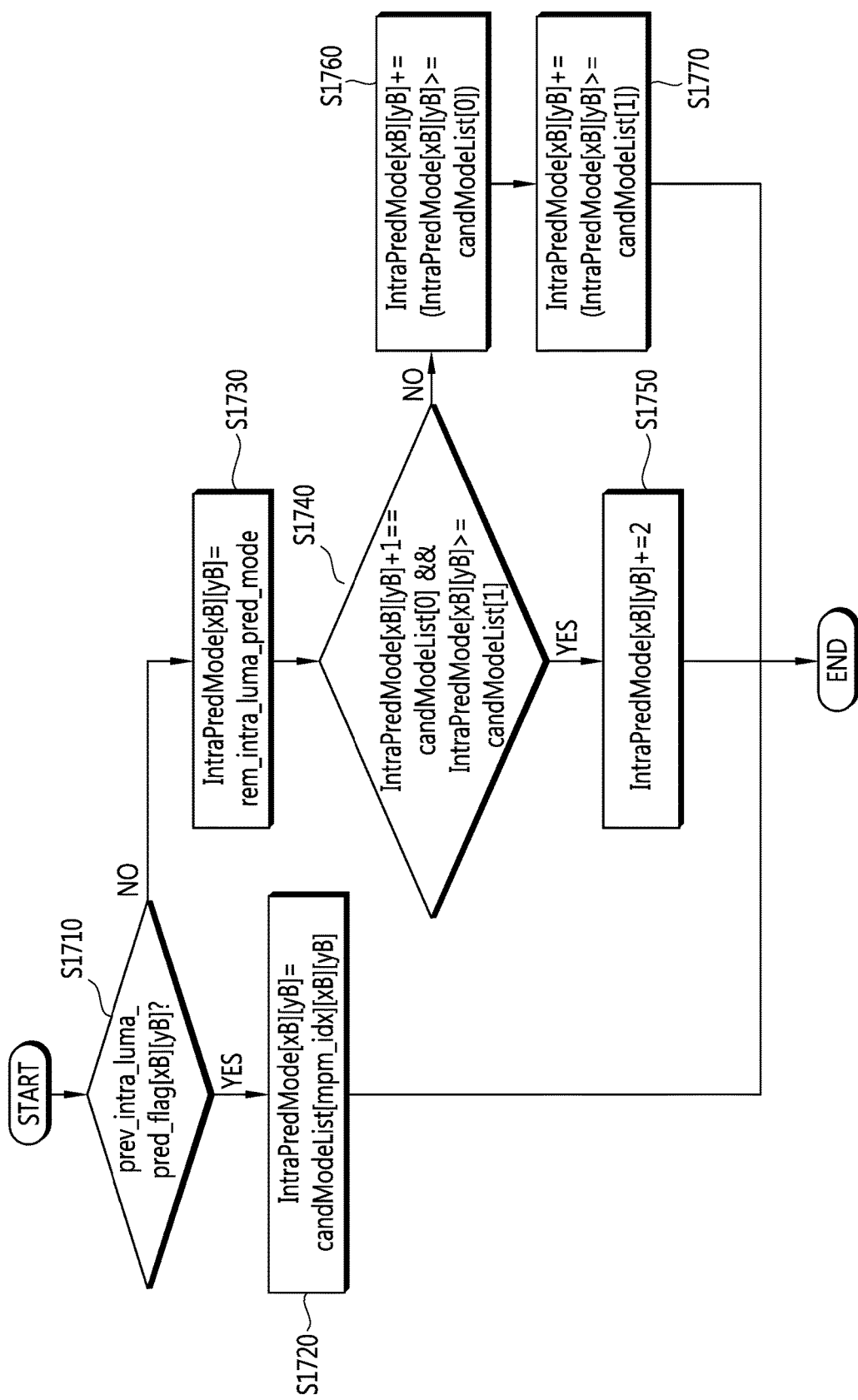
FIG. 17 is a flowchart schematically illustrating another example of a method of decoding an MPM index and remaining intra prediction modes according to the present invention in case the intra prediction mode decoding method described in connection with FIG. 14 applies.

Since in the intra prediction mode encoding and/or decoding method according to an embodiment of the present invention as described above in connection with FIG. 14, an MPM sorting operation may be skipped irrespective of presence and absence of an MPM having the same prediction mode as the intra prediction mode of the current prediction unit, operation complexity of the encoder and/or decoder may be reduced compared with the intra prediction mode encoding and/or decoding method described above in connection with FIG. 10. Referring to FIGS. 15 to 17, a method of encoding and/or decoding an intra prediction mode even without performing an MPM sorting operation is hereinafter described in more detail.

FIG. 15 is a flowchart schematically illustrating an example of a method of encoding an MPM index and a remaining intra prediction mode according to the present invention in case an intra prediction mode encoding method as described in connection with FIG. 14 applies.

In the embodiment of FIG. 15, it is assumed, for convenience of description, that two MPMs are derived from a neighboring prediction unit. For example, as described above in connection with FIG. 11 or 12, a first MPM with an MPM index value assigned with 0 and a second MPM with an MPM index value assigned with 1 may be derived. The embodiment of FIG. 15 may be likewise applicable to the case where three or more MPMs are derived.

Referring to FIG. 15, the encoder determines whether there is, among MPMs derived from a neighboring prediction unit, an MPM having the same prediction mode as an intra prediction mode of a current prediction unit and may encode this using an MPM flag (S1510). For example, the MPM flag may be prev_intra_luma_pred_flag. In case there is, among the derived MPMs, an MPM having the same prediction mode as the intra prediction mode of the current prediction unit, the MPM flag value may be 1, and the MPM flag value may be otherwise 0.

In case there is, among the MPMs derived from the neighboring prediction unit, an MPM having the same prediction mode as the intra prediction mode of the current prediction unit, the encoder may encode an MPM index indicating which one of the derived MPMs is the same as the intra prediction mode of the current prediction unit (S1520). For example, the MPM index may be mpm_idx.

Unless there is, among the MPMs derived from the neighboring prediction unit, an MPM having the same prediction mode as the intra prediction mode of the current prediction unit, the encoder may encode the remaining intra prediction modes. For example, a remaining intra prediction mode may be rem_intra_luma_pred_mode.

More specifically, the encoder inserts a mode value (e.g., IntraPredMode) of the intra prediction mode derived from the current prediction unit into a remaining intra prediction mode (e.g., rem_intra_luma_pred_mode) (S1530).

In case the remaining intra prediction mode (e.g., rem_intra_luma_pred_mode) value determined in step S1530 is larger than a mode value (e.g., candModeList[0]) of a first MPM of the derived MPMs, the encoder reduces the remaining intra prediction mode (e.g., rem_intra_luma_pred_mode) value by 1 (S1540).

In case the remaining intra prediction mode (e.g., rem_intra_luma_pred_mode) value determined in step S1540 is equal to or larger than a mode value (e.g., candModeList[1]) of a second MPM of the derived MPMs, the encoder reduces the remaining intra prediction mode (e.g., rem_intra_luma_pred_mode) value by 1 (S1550).

The encoder may encode the remaining intra prediction mode (e.g., rem_intra_luma_pred_mode) determined in steps S1530 to S1550 as a final intra prediction mode for the current prediction unit (S1560).

FIG. 16 is a flowchart schematically illustrating an example of a method of decoding an MPM index and remaining intra prediction modes according to the present invention in case the intra prediction mode decoding method described in connection with FIG. 14 applies.

In the embodiment of FIG. 16, it is assumed for ease of description that two MPMs are derived from a neighboring prediction unit. For example, as described above in connection with FIG. 11 or 12, a first MPM with an MPM index value assigned with 0 and a second MPM with an MPM index value assigned with 1 may be derived. The embodiment of FIG. 16 may also be applicable to the case where three or more MPMs are derived.

Referring to FIG. 16, the decoder may decode the MPM flag and may determine, based on the decoded MPM, whether there is, among the MPMs derived from the neighboring prediction unit, an MPM having the same prediction mode as the intra prediction mode of the current prediction unit (S1610). For example, the MPM flag may be prev_intra_luma_pred_flag. In case there is, among the derived MPMs, an MPM having the same prediction mode as the intra prediction mode of the current prediction unit, the MPM flag (e.g., prev_intra_luma_pred_flag) value may be 1, and otherwise, the MPM flag (e.g., prev_intra_luma_pred_flag) value may be 0.

In case there is, among the derived MPMs, an MPM having the same prediction mode as the intra prediction mode of the current prediction unit, the decoder may decode an MPM index and may derive the intra prediction mode of the current prediction unit based on the decoded MPM index (S1620). As described above, the MPM index is an index indicating which one of the derived MPMs is the same as the intra prediction mode of the current prediction unit. For example, the MPM index may be mpm_idx, and an MPM (e.g., candModeList[mpm_idx]) indicated by the MPM index (e.g., mpm_idx) may be derived as the intra prediction mode (e.g., IntraPredMode) of the current prediction unit.

Unless there is, among the derived MPMs, an MPM having the same prediction mode as the intra prediction mode of the current prediction unit, the decoder may decode a remaining intra prediction mode and may derive the intra prediction mode of the current prediction unit through a conditional equation using the derived MPMs and the decoded remaining intra prediction mode. Accordingly, the decoder may decode the intra prediction mode only with an additional condition test without performing a re-sorting process on the MPMs.

The remaining intra prediction modes, as described above, are prediction modes encoded using remaining intra prediction mode except the MPMs derived from the neighboring prediction unit. For example, a remaining intra prediction mode may be rem_intra_luma_pred_mode.

More specifically, the decoder decodes a remaining intra prediction mode (e.g., rem_intra_luma_pred_mode) and assigns the value of the decoded remaining intra prediction mode (e.g., rem_intra_luma_pred_mode) to the intra prediction mode (e.g., IntraPredMode) of the current prediction unit to be derived (S1630).

If the value of the intra prediction mode (e.g., IntraPredMode) of the current prediction unit determined in step S1630 is equal to or larger than the mode value (canModeList[0]) of a first MPM of the derived MPMs, the decoder increases the value of the intra prediction mode (e.g., IntraPredMode) of the current prediction unit by 1. Or, if a value obtained by adding 1 to the value of the intra prediction mode (e.g., IntraPredMode) of the current prediction unit determined in step S1630 is equal to the mode value (candModeList[0]) of the first MPM of the derived MPMs and the value of the intra prediction mode (e.g., IntraPredMode) of the current prediction unit determined in step S1630 is equal to or larger than the mode value (canModeList[1]) of the second MPM of the derived MPMs, the decoder increases the value of the intra prediction mode (e.g., IntraPredMode) of the current prediction unit by 1 (S1640).

If the value of the intra prediction mode (e.g., IntraPredMode) of the current prediction unit determined in step S1640 is equal to or larger than the mode value (candModeList[1]) of the second MPM of the derived MPMs, the decoder increases the intra prediction mode (e.g., IntraPredMode) of the current prediction unit by 1 (S1650).

The decoder may derive the intra prediction mode (e.g., IntraPredMode) of the current prediction unit determined in steps S1630 to S1650 as a final intra prediction mode for the current prediction unit.

FIG. 17 is a flowchart schematically illustrating another example of a method of decoding an MPM index and remaining intra prediction modes according to the present invention in case the intra prediction mode decoding method described in connection with FIG. 14 applies.

In the embodiment of FIG. 17, it is assumed, for ease of description, that two MPMs are derived from a neighboring prediction unit. For example, as described in connection with FIG. 11 or 12, a first MPM with an MPM index value assigned with 0 and a second MPM with an MPM index value assigned with 1 may be derived. The embodiment of FIG. 17 may be also applicable to the case where three or more MPMs are derived.

Referring to FIG. 17, the decoder may decode an MPM flag and may determine, based on the decoded MPM flag, whether there is, among MPMs derived from a neighboring prediction unit, an MPM having the same prediction mode as an intra prediction mode of a current prediction unit (S1710). For example, the MPM flag may be prev_intra_luma_pred_flag. In case there is, among the derived MPMs, an MPM having the same prediction mode as the intra prediction mode of the current prediction unit, the MPM flag (e.g., prev_intra_luma_pred_flag) value may be 1, and otherwise, the MPM flag (e.g., prev_intra_luma_pred_flag) value may be 0.

In case there is, among the derived MPMs, an MPM having the same prediction mode as the intra prediction mode of the current prediction unit, the decoder may decode an MPM index and may derive the intra prediction mode of the current prediction unit based on the decoded MPM index (S1720). As described above, the MPM index is an index indicating which one of the derived MPMs is the same as the intra prediction mode of the current prediction unit. For example, the MPM index may be mpm_idx, and an MPM (e.g., candModeList[mpm_idx]) indicated by the MPM index (e.g., mpm_idx) may be derived as the intra prediction mode (e.g., IntraPredMode) of the current prediction unit.

Unless there is, among the derived MPMs, an MPM having the same prediction mode as the intra prediction mode of the current prediction unit, the decoder may decode a remaining intra prediction mode and may derive the intra prediction mode of the current prediction unit. At this time, the decoder may derive the intra prediction mode of the current prediction unit through a conditional equation using the derived MPMs and the decoded remaining intra prediction mode without performing a sorting operation on the derived MPMs.

The remaining intra prediction mode, as described above, is a prediction mode encoded using the remaining intra prediction modes except the MPMs derived from the neighboring prediction unit. For example, a remaining intra prediction mode may be rem_intra_luma_pred_mode.

More specifically, the decoder decodes a remaining intra prediction mode (e.g., rem_intra_luma_pred_mode) and assigns the value of the decoded remaining intra prediction mode (e.g., rem_intra_luma_pred_mode) to the intra prediction mode (e.g., IntraPredMode) of the current prediction unit (S1730).

The decoder determines whether a value obtained by adding 1 to the value of the intra prediction mode (e.g., IntraPredMode) of the current prediction unit determined in step S1730 is the same as the mode value (candModeList[0]) of the first MPM of the derived MPMs (condition 1) and whether the value of the intra prediction mode (e.g., IntraPredMode) of the current prediction unit determined in step S1730 is equal to or larger than the mode value (candModeList[1]) of the second MPM of the derived MPMs (condition 2) (S1740).

In case as a result of step S1740 conditions 1 and 2 are met, the decoder increases the value of the intra prediction mode (e.g., IntraPredMode) of the current prediction unit by 2 (S1750).

In case as a result of step S1740 neither condition 1 nor condition 2 is met, if the value of the intra prediction mode (e.g., IntraPredMode) of the current prediction unit determined in step S1730 is equal to or larger than the mode value (candModeList[0]) of the first MPM of the derived MPMs, the decoder increases the intra prediction mode (e.g., IntraPredMode) of the current prediction unit by 1 (S1760).

If the value of the intra prediction mode (e.g., IntraPredMode) of the current prediction unit determined in step S1760 is equal to or larger than the mode value (candModeList[1]) of the second MPM of the derived MPMs, the decoder increases the value of the intra prediction mode (e.g., IntraPredMode) of the current prediction unit by 1 (S1770).

The decoder may derive the intra prediction mode (e.g., IntraPredMode) of the current prediction unit determined in steps S1730 to S1770 as a final intra prediction mode of the current prediction unit.

The intra prediction mode encoding and/or decoding method according to the present invention does not always perform a sorting operation such as min/max after MPMs are derived but rather performs a sorting operation such as min/max only upon encoding and/or decoding a remaining intra prediction mode in case there is no MPM having the same prediction mode as the intra prediction mode of the current prediction unit. Or, the intra prediction mode encoding and/or decoding method according to the present invention may skip a sorting operation such as min/max that is carried out after MPMs are derived by performing an additional condition check through comparison between MPMs and remaining intra prediction modes. Accordingly, in case the intra prediction mode encoding and/or decoding method according to the present invention applies, operation complexity of the encoder and/or decoder may be reduced. Further, the present invention may be applicable to all applications that use video codecs.

In the embodiments described above, the methods are described based on flowcharts with a series of steps or blocks. However, the present invention is not limited to the order of the steps, and some steps may be performed in an order different from the order of the steps or simultaneously with the order of the steps. Further, it may be understood by those skilled in the art that the steps shown in the flowcharts may include other steps or some thereof may be deleted without affecting the scope of the present invention.

The above-described embodiments are merely an example of the present invention, and various modifications and variations may be made to the present invention by those skilled in the art to which the present invention pertains. Accordingly, the embodiments of the present invention are provided to describe, rather than limiting, the present invention, and the scope of the present invention should be not limited to the embodiments. The scope of the present invention is defined by the appending claims, and all technical spirit of the equivalents of the present invention should be construed as included in the scope of the present invention.

What is claimed is:

1. An image decoding method, with a decoding apparatus, the method comprising:
   generating, with the decoding apparatus, an MPM list comprising a plurality of MPMs (Most Probable Modes) for a current prediction unit,
   wherein the MPMs are derived based on intra prediction modes of neighboring prediction units to the current prediction unit, and the neighboring prediction units comprise a left neighboring prediction unit and an upper neighboring prediction unit,
   wherein the MPM list comprises three MPMs as candidate intra prediction modes of the current prediction unit, the three MPMs comprising a first MPM, a second MPM and a third MPM, and
   wherein when the intra prediction modes of the neighboring prediction units are the same, the first MPM is set equal to the intra prediction modes of the neighboring prediction units while the second MPM is set different to the intra prediction modes of the neighboring prediction units;
   deriving, with the decoding apparatus, an intra prediction mode of the current prediction unit based on the MPM list and an MPM flag indicating whether there is, among the derived MPMs, an MPM having the same prediction mode as the intra prediction mode of the current prediction unit;
   generating, with the decoding apparatus, a prediction block of the current prediction unit by performing intra prediction on the current prediction unit based on the intra prediction mode of the current prediction unit; and
   generating, with the decoding apparatus, a restored block of the current prediction unit using the prediction block of the current prediction unit,
   wherein in response to the MPM flag indicating that there is, among the derived three MPMs, no MPM having the same prediction mode as the intra prediction mode of the current prediction unit, deriving the intra prediction mode of the current prediction unit comprises:
   comparing, with the decoding apparatus, the three MPMs in the MPM list,
   rearranging, with the decoding apparatus, the three MPMs based on results of the comparison, the rearranging being performed by changing positions of the three MPMs in an ascending order of mode values, the step of rearranging is performed only if the MPM flag indicates that there is, among the derived three MPMs, no MPM which has the same intra prediction mode of the current prediction unit;

setting, with the decoding apparatus, a remaining intra prediction mode as a candidate intra prediction mode of the current prediction unit, the remaining intra prediction mode being determined based on remaining intra prediction modes except the derived three MPMs among all intra prediction modes;

increasing, with the decoding apparatus, a value of the candidate intra prediction mode by 1 when the value of the candidate intra prediction mode is equal to or greater than the value of a first rearranged MPM;

increasing, with the decoding apparatus, the value of the candidate intra prediction mode by 1 when the value of the candidate intra prediction mode is equal to or greater than the value of a second rearranged MPM;

increasing, with the decoding apparatus, the value of the candidate intra prediction mode by 1 when the value of the candidate intra prediction mode is equal to or greater than the value of a third rearranged MPM; and deriving, with the decoding apparatus, the intra prediction mode of the current prediction unit based on an intra prediction mode corresponding to the value of the candidate intra prediction mode.

2. An image encoding method, with an encoding apparatus, the method comprising:

determining an intra prediction mode of a current prediction unit;

generating an MPM list comprising a plurality of MPMs (Most Probable Modes) for the current prediction unit, wherein the MPMs are derived based on intra prediction modes of neighboring prediction units to the current prediction unit, and the neighboring prediction units comprise a left neighboring prediction unit and an upper neighboring prediction unit, wherein the MPM list comprises three MPMs as candidate intra prediction modes of the current prediction unit, the three MPMs comprising a first MPM, a second MPM and a third MPM, and wherein when the intra prediction modes of the neighboring prediction units are the same, the first MPM is set equal to the intra prediction modes of the neighboring prediction units while the second MPM is set different to the intra prediction modes of the neighboring prediction units; and encoding an MPM flag indicating whether there is, among the three MPMs, an MPM having the same prediction mode as the intra prediction mode of the current prediction unit;

wherein, when there is no MPM having the same prediction mode as the intra prediction mode of the current prediction mode, the method further comprising:

comparing the three MPMs in the MPM list;

rearranging the three MPMs based on results of the comparison, wherein the rearranging is performed by changing positions of the three MPMs in an ascending order of mode values, and the step of rearranging is performed only if there is, among derived three MPMs, no MPM which has the same intra prediction mode of the current prediction unit;

determining a remaining intra prediction mode based on the rearranged three MPMs; and encoding the remaining intra prediction mode, wherein the determining the remaining intra prediction mode based on the rearranged three MPMs comprising:

deriving a candidate intra prediction mode of the current prediction unit based on the intra prediction mode of the current prediction unit;

decreasing a value of the candidate intra prediction mode by 1 when the value of the candidate intra prediction mode is greater than the value of a third rearranged MPM;

decreasing the value of the candidate intra prediction mode by 1 when the value of the candidate intra prediction mode is greater than the value of a second rearranged MPM;

decreasing the value of the candidate intra prediction mode by 1 when the value of the candidate intra prediction mode is greater than the value of a first rearranged MPM; and determining the remaining intra prediction mode based on the value of the candidate intra prediction mode.

\* \* \* \* \*